United States Patent
Van Haesendonck et al.

(10) Patent No.: US 9,480,262 B2
(45) Date of Patent: Nov. 1, 2016

(54) BREAD WITH INCREASED ARABINOXYLO-OLIGOSACCHARIDE CONTENT

(75) Inventors: Ingrid Van Haesendonck, Mechelen (BE); Willem Broekaert, Dilbeek (BE); Jacques Georis, Liege (BE); Jan Delcour, Heverlee (BE); Christophe Courtin, Wilsele (BE); Filip Arnaut, Roosdaal (BE)

(73) Assignee: Puratos N.V., Groot-Bijgaarden (BE)

( * ) Notice: Subject to any disclaimer, the term of this patent is extended or adjusted under 35 U.S.C. 154(b) by 671 days.

(21) Appl. No.: 12/522,148

(22) PCT Filed: Jan. 16, 2008

(86) PCT No.: PCT/EP2008/050469
§ 371 (c)(1),
(2), (4) Date: Jul. 9, 2009

(87) PCT Pub. No.: WO2008/087167
PCT Pub. Date: Jul. 24, 2008

(65) Prior Publication Data
US 2010/0040736 A1     Feb. 18, 2010

Related U.S. Application Data

(60) Provisional application No. 60/880,799, filed on Jan. 16, 2007.

(51) Int. Cl.
*A21D 8/04*     (2006.01)
*A21D 13/02*    (2006.01)

(52) U.S. Cl.
CPC ............... *A21D 8/042* (2013.01); *A21D 13/02* (2013.01)

(58) Field of Classification Search
CPC ............................. A21D 8/042; A21D 13/02

USPC ........................................................... 426/20
See application file for complete search history.

(56) References Cited

U.S. PATENT DOCUMENTS

| | | | |
|---|---|---|---|
| 3,879,373 A * | 4/1975 | Gerrish et al. ................ | 536/128 |
| 5,306,633 A | 4/1994 | Gottschalk et al. | |

(Continued)

FOREIGN PATENT DOCUMENTS

| | | |
|---|---|---|
| GB | 2 431 560 A | 5/2007 |
| WO | WO 96/32472 | 10/1996 |

(Continued)

OTHER PUBLICATIONS

Selinheimo, E., Kruus, K., Buchert, J., Hopia, A., Autio, K., "Effects of laccase, xylanase and their combination on the rheological properties of wheat doughs," Journal of Cereal Science, 43 (2006) 152-159.*

(Continued)

*Primary Examiner* — Jeffrey Mornhinweg
(74) *Attorney, Agent, or Firm* — Knobbe Martens Olson & Bear LLP

(57) ABSTRACT

A method for increasing in a baked product, after baking, the level of water-soluble arabinoxylan with an average degree of polymerization ranging from 5 to 50, comprising preparing a dough for a baked product with flour having a total arabinoxylan content of at least 2.0%, and adding to the dough an enzyme preparation comprising at least one thermophilic endoxylanase in an amount at least two-fold higher than the amount conferring 90% of the maximal bread volume increase obtained by addition of such enzyme preparation to the recipe of the baked product. Using this method, baked products can be obtained that have a level of arabinoxylan of at least 1.7% The present invention further relates to baked products obtainable by this method, and to an improver and a dough which may be used for the preparation of such products.

2 Claims, 2 Drawing Sheets

(56) References Cited

U.S. PATENT DOCUMENTS

Figure 1:
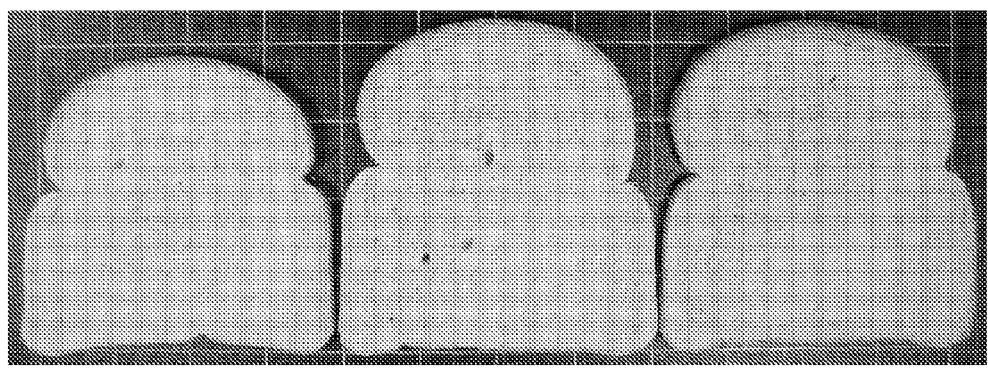

| | | | |
|---|---|---|---|
| 5,849,559 A * | 12/1998 | Van Der Wouw et al. | 435/209 |
| 6,110,508 A * | 8/2000 | Olesen et al. | 426/20 |
| 7,829,128 B2 * | 11/2010 | Karwowski et al. | 426/94 |
| 2003/0104103 A1 * | 6/2003 | Monsalve-Gonzalez et al. | 426/549 |

FOREIGN PATENT DOCUMENTS

| | | | |
|---|---|---|---|
| WO | WO 02/060262 A | 8/2002 | |
| WO | WO 2006/002495 A1 * | 1/2006 | A23L 1/30 |
| WO | WO 2006/046146 A | 5/2006 | |

OTHER PUBLICATIONS

Fiszman, S. M., Salvador, A. and Varela, P., "Methodological developments in bread staling assessment: application to enzyme-supplemented brown pan bread," Eur. Food Res. Technol., 221 (2005) 616-623).*

Vinkx, C. J. A. and Delcour, J. A., "Rye (*Secale cereale* L.) Arabinoxylans: A Critical Review," Journal of Cereal Science, 24 (1996) 1-14.*

Butt M S et al., "Xylanases and Their Applications in Baking Industry," Food Technology and Biotechnology, Zagreb, HR, [Online], vol. 46, No. 1, Jan. 1, 2008, pp. 22-31.

Courtin C.M. et al., "Arabinoxylans and Endoxylanases in Wheat Flour Bread-Making," Journal of Cereal Science, vol. 35, 2002, pp. 225-243.

Denli E. et al: "Effect of Added Pentosans Isolated From Wheat and Rye Grain on Some Properties of Bread," European Food Research and Technology, Springer Verlag, Heidelberg, DE, vol. 25, No. 6, Jan. 1, 2000, pp. 374-376.

Jiang Z., et al., "Improvement of the Breadmaking Quality of Wheat Flour by the Hypethermophilic Xylanase B From *Thermotoga maritima*" Food Research International, vol. 38, 2005, pp. 37-43.

Katina K. et al., "Effects of sourdough and enzymes on staling of high-fibre wheat bread" Jun. 1, 2006, Lebensmittel Wissenschaft Und Technologie, Academic Press, London, GB, pp. 479-491.

Laurikainen T. et al., "Effects of Enzymes in Fibre-Enriched Baking," Journal of Science of Food and Agriculture, vol. 76, 1998, pp. 239-249.

The International Search Report issued to corresponding PCT Application No. PCT/EP2008/050469, mailed Mar. 11, 2009.

Izydorczyk, et al. 1991. Comparison of the structure and composition of water-soluble pentosans from different wheat varieties. *Cereal Chem.*, 68(2):139-144.

Selinheimo, et al. 2007. Elucidating the mechanism of laccase and tyrosinase in wheat bread making. *J. Agric. Food Chem.*, 55(15):6357-6365.

* cited by examiner

BREAD WITH INCREASED ARABINOXYLO-OLIGOSACCHARIDE CONTENT

RELATED APPLICATIONS

This application is the U.S. National Phase filing under 35 U.S.C. §371 of PCT/EP2008/050469, filed Jan. 16, 2008, entitled "Bread With Increased Arabinoxylo-Oligosaccharide Content", which designated the United States and was published in English on Jul. 24, 2008, which claims priority to US Provisional Patent Application No. 60/880,799, filed Jan. 16, 2007.

FIELD OF THE INVENTION

The present invention relates to methods and means for increasing the level of water-soluble arabinoxylan oligosaccharides in baked products, involving the use of exogenously added enzymes in the recipe, in order to obtain baked products with improved health benefits. Moreover, the present invention relates to baked products enriched with water-soluble arabinoxylan oligosaccharides.

BACKGROUND OF THE INVENTION

Bread and pastry products are made on the basis of cereals or cereal fractions, which are milled to flour and mixed with yeast or chemical leavening agent, salt and water as key ingredients. Other ingredients such as sugar, fat, milk, oxidants, emulsifiers and enzymes can be added to facilitate processing and/or to improve taste or structure of the baked product and/or its shelf life. The process can be divided in three basic unit operations i.e. i) mixing and formation of a visco-elastic dough by kneading, ii) leavening of the dough through the action of yeast or chemical leavening agents, and iii) baking (Hoseney, 1994).

Arabinoxylan (AX), also referred to as pentosan, is a major constituent of cereal grains, occurring at 5-10% of dry weight of the cereal grains. AX can be divided into either water-extractable AX (WE-AX) and water-unextractable AX (WU-AX), both of which have a similar structure but differ in the level of cross-linking with other natural polymers. In general, AX from cereals consists of a backbone of beta-(1-4)-linked D-xylopyranosyl residues (xylose), some of which are mono- or disubstituted with alpha-L-arabinofuranosyl residues (arabinose). In addition, other substituents, such as ferulic acid, coumaric acid, acetic acid or (methyl)glucuronic acid, are coupled to some of the xylose and/or arabinose residues of AX.

AX is recognized to be important in the production of bread and pastry products. AX from wheat endosperm flour (about 2% of dry flour weight) are estimated to bind 23% of all water in a wheat flour dough (Bushuk, 1966). Addition of increasing levels of WE-AX or WU-AX increases dough development time and dough consistency when water absorption is kept constant. The increase in dough consistency is higher for WU-AX than for WE-AX, while the increase in development time is higher when WE-AX are added (Michniewicz et al., 1991). Both WE-AX and WU-AX increase the Farinograph water absorption (Michniewicz et al., 1991). Farinograph water absorption is also affected by the MW of AX. At similar AX concentrations, HMW (high molecular weight) AX fractions have higher impact on Farinograph water absorption values than LMW (low molecular weight) AX fractions (Michniewicz et al., 1991; Biliaderis et al., 1995; Courtin et al. 1998). Addition of WE-AX to wheat flour enhances bread loaf volume, while addition of WU-AX decreases it (Michniewicz et al., 1992; Courtin et al. 1999).

Endoxylanases hydrolyse internal linkages in the AX chain, thereby affecting the structure and physicochemical properties of AX. Optimal levels of the right type of endoxylanases improve dough and bread characteristics (McCleary, 1986; Rouau et al., 1994) and some endoxylanases are therefore currently marketed as improvement agents for baked products. Addition of endoxylanases at optimal doses during bread-making has the following desirable effects (Rouau et al., 1994):

increased viscosity and elasticity of the dough;
increased loaf volume after baking;
softer crumb structure (reduced crumb firmness).

The beneficial effect of endoxylanase addition in bread-making is due to transformation of WU-AX into enzyme-solubilized AX (ES-AX, i.e. a fraction of AX that has become water-extractable through the action of exogenously added endoxylanases on the originally present WU-AX). Hypothetical explanations for the causal effect of increased levels of ES-AX or reduced levels of WU-AX on the above described improvement of dough and bread characteristics include the following (Rouau et al., 1994; Courtin and Delcour, 2002):

reduction of the water-binding capacity of WU-AX, resulting in a redistribution of previously bound water over other dough components such as gluten, thus improving the development of the gluten network and hence dough extensibility;
reduction of WU-AX levels that destabilize the dough structure because they can form physical barriers for the gluten network and can perforate gas cells, resulting in coalescence and decreased gas retention;
increased viscosity of the dough aqueous phase due to higher levels of ES-AX, thus stabilizing water films in gas cells during dough fermentation;
slowing down of the rate of diffusion of carbon dioxide out of the dough system due to improved mechanical strength or reduced gas permeability of the liquid films in the dough, resulting in higher gas retention during dough fermentation, and thus increasing loaf volume after baking.

SUMMARY OF THE INVENTION

The present invention provides a method for increasing in a baked product, after baking, the level of water-soluble arabinoxylan with an average degree of polymerization ranging from 5 to 50, preferably ranging from 5 to 35, more preferably ranging from 5 to 25, said method comprising the steps of:

Preparing a dough for a baked product with flour or a mixture of flours having a total arabinoxylan content of at least 2.5% (w/w, % of dry weight), and Adding to said dough an enzyme preparation comprising at least one thermophilic endoxylanase in an amount at least 2-fold higher, preferably at least 3 to 6 times higher or even 10 times higher than the dose conferring 90% of the maximal bread volume increase obtained by addition of such enzyme preparation to the recipe of said baked product.

The present invention also provides a method for increasing in a baked product, after baking, the level of water-soluble arabinoxylan with an average degree of polymerization ranging from 5 to 50, preferably ranging from 5 to 35, more preferably ranging from 5 to 25, said method comprising the steps of:

Preparing a dough for a baked product with a mixture of one or more milling fractions comprising at least 40% (w/w), preferably at least 50%, more preferably at least for 60%, most preferably at least 70% of flour derived from wheat, said mixture having a total arabinoxylan content of at least 2.5% (w/w, % of dry weight), and Adding to said dough an enzyme preparation comprising at least one thermophilic endoxylanase in an amount at least 2-fold higher, preferably at least 3 to 6 times higher or even 10 times higher than the dose conferring 90% of the maximal bread volume increase obtained by addition of such enzyme preparation to the recipe of said baked product.

Preferably, in a method of the invention, the dough is prepared with a mixture of one or more milling fractions, said mixture having a total arabinoxylan content of at least 2% (w/w, % of dry weight), and further to said enzyme preparation comprising at least one thermophilic endoxylanase, in addition, at least one endoxylanase highly selective for WU-AX is added to said dough.

Preferably, in a method of the invention, said amount of said thermophilic endoxylanase is an amount sufficient to provide in said baked product, after baking, a level of said water-soluble arabinoxylans of at least 1.56 g/100 g dry matter up to 7 g/100 g dry matter, more preferably of at least 1.7 g/100 g dry matter up to 7 g/100 g dry matter, even more preferably of at least 1.8, 1.9, or even 2.0 g/100 g dry matter up to 7 g/100 g dry matter.

Preferably, in a method of the invention, said endoxylanase is a *Trichoderma longibrachiatum*, an *Aspergillus aculeatus*, a *Thermomyces lanuginosus*, and/or a *Thermotoga maritima* thermophilic endoxylanase, more preferably a *Trichoderma longibrachiatum*, a *Thermomyces lanuginosus*, and/or a *Thermotoga maritima* thermophilic endoxylanase.

Preferably, in a method of the invention, said enzyme preparation further comprises at least one endoxylanase highly selective for WU-AX.

Said at least one endoxylanase highly selective for WU-AX can be directly added to the dough.

Preferably, in a method of the invention, said enzyme preparation further comprises at least one enzyme selected from the group consisting of alpha-L-arabinofuranosidases, methyl glucuronidases, feruloyl esterases, beta-glucanases and cellulases.

Said at least one enzyme selected from the group consisting of alpha-L-arabinofuranosidases, methyl glucuronidases, feruloyl esterases, beta-glucanases and cellulases can be added directly to the dough.

Preferably, in a method of the invention, said flour is wheat endosperm flour, wheat wholegrain flour or a mixture of wheat wholegrain flour and wheat endosperm flour.

Preferably, in a method of the invention, said mixture of one or more milling fractions further comprises bran at a level of less than 25% (w/w), more preferably, at a level of less than 20% (w/w).

Said bran is preferably selected from the group consisting of wheat aleurone-enriched bran, rye aleurone-enriched bran, rye bran, wheat bran, barley bran, corn bran and/or rice bran, more preferably from the group consisting of wheat, wheat aleurone-enriched bran, rye aleurone-enriched bran and/or rye bran.

Preferably, in a method of the invention, said mixture of one or more milling fractions further comprises flour derived from rye at a level of less than 50% (w/w), more preferably less than 40% (w/w), most preferably less than 30% (w/w).

Said flour derived from rye is preferably rye endosperm flour, rye wholegrain flour or a mixture of rye wholegrain flour and rye endosperm flour.

Preferably, in a method of the invention, the dough is further supplemented with an ingredient comprising water-soluble arabinoxylan with an average degree of polymerization ranging from 5 to 50, more preferably ranging from 5 to 35, even more preferably ranging from 5 to 25.

The present invention also provides a method for increasing in a baked product, after baking, the level of water-soluble arabinoxylan with an average degree of polymerization ranging from 5 to 50, preferably ranging from 5 to 35, more preferably ranging from 5 to 25, to a level above 1.56 g/100g, above 1.7 g/100 g dry matter, above 1.75 g/100 g dry matter, preferably to a level of at least 1.9 g/100 g dry matter, said method comprising the steps of:

Preparing a dough for a baked product with a mixture of one or more milling fractions comprising at least 40% (w/w), preferably at least 50%, more preferably at least for 60%, most preferably at least 70% of flour derived from wheat, Adding to said dough an enzyme preparation comprising at least one endoxylanase, in an amount at least 2-fold higher, preferably at least 3 to 6 times higher or even 10 times higher than the dose conferring 90% of the maximal bread volume increase obtained by addition of such enzyme preparation to the recipe of said baked product, as well as an ingredient comprising at least 8% (w/w %, on the total content) of water-soluble arabinoxylan with an average degree of polymerization ranging from 5 to 50, preferably ranging from 5 to 35, more preferably ranging from 5 to 25.

Preferably, in a method of the invention, said endoxylanase is a thermophilic endoxylanase, preferably is a *Trichoderma longibrachiatum*, an *Aspergillus aculeatus*, a *Thermomyces lanuginosus*, and/or a *Thermotoga maritima* thermophilic endoxylanase. More preferably, said endoxylanase is a *Trichoderma longibrachiatum*, a *Thermomyces lanuginosus*, and/or a *Thermotoga maritima* thermophilic endoxylanase.

In a method of the invention, at least one endoxylanase highly selective for WU-AX can be comprised in said enzyme preparation or can be added directly to the dough.

The present invention also provides a baked product with a level of at least 1.56 g/100 g dry matter, preferably 1.7 g/100 g dry matter, more preferably at least 1.75 g/100 g dry matter, and up to 7 g/100 g dry matter of water-soluble arabinoxylan having an average degree of polymerization ranging from 5 to 50, preferably ranging from 5 to 35, more preferably ranging from 5 to 25, said product being obtainable by a method according to the invention.

Preferably, said baked product comprises at least one thermophilic endoxylanase, and said baked product has a level of at least 1.56 g/100 g dry matter, at least 1.7 g/100 g dry matter, and up to 7 g/100 g dry matter, of water-soluble arabinoxylan with an average DP ranging from 5 to 50, preferably ranging from 5 to 35, most preferably ranging from 5 to 25.

In a baked product according to the invention, the major part of said water-soluble arabinoxylan can be derived from arabinoxylan present in the recipe of the baked product.

Preferably, in a baked product according to the invention, the entire amount of said water-soluble arabinoxylan is derived from arabinoxylan present in the recipe of the baked product.

The present invention also provides a composition suitable for the preparation of a baked product according to the invention, said composition comprising at least one thermophilic endoxylanase, and further comprising at least one, preferably at least 2 ingredients selected from the group consisting of gluten, starch, additives such as emulsifiers (e.g. monoglycerides, diglycerides, diacetyl tartaric acid esters of monoglycerides (DATEM), stearoyllactylates, lecithine and the like), enzymes (e.g. xylanases, alpha-amylases, lipases, oxido reductases, proteases), reducing compounds (e.g. cysteine), oxidizing compounds (e.g. ascorbic acid, azodicarbonamide and bromate) hydrocolloids and prebiotics (e.g. galactooligosaccharides, arabinooligosaccharides, xylooligosaccharides, fructooligosaccharides, inulin, resistant starch, resistant dextrins, . . . ).

Said composition according to the invention can be used as an improver composition, in a liquid or powder form, or used in a ready-to-use optimized mix.

Said composition can further comprise at least one enzyme selected from the group consisting of alpha-L-arabinofuranosidases, methyl glucuronidases, feruloyl esterases, beta-glucanases, cellulases and endoxylanases highly selective for WU-AX.

The present invention also provides a dough for a baked product, comprising a mixture of one or more milling fractions comprising at least 40% (w/w), preferably at least 50%, more preferably at least for 60%, most preferably at least 70% of flour derived from wheat, said mixture having a total arabinoxylan content of at least 2.0% and preferably at least 2.5% (w/w), and said dough comprising an amount of at least one thermophilic endoxylanase sufficient to provide, after baking, a baked product with a level of water-soluble arabinoxylan having an average degree of polymerization ranging from 5 to 50, preferably ranging from between 5 to 35, more preferably ranging from 5 to 25, which level is at least equal to, preferably is superior to 1.7 g/100 g dry matter and up to 7 g/100 g dry matter.

The dough according to the invention can further comprise at least one enzyme selected from the group consisting of alpha-L-arabinofuranosidases, methyl glucuronidases, feruloyl esterases, beta-glucanases, cellulases and endoxylanases highly selective for WU-AX.

In a dough according to the invention, said mixture of milling fractions can be one as recited in a method of the invention.

The present invention also provides a baked product prepared from a dough according to the invention.

The dough according to the invention can be used for the preparation of a bread or a pastry product with an increased level of water-soluble arabinoxylan having an average degree of polymerization ranging from 5 to 50, preferably ranging from 5 to 35, more preferably ranging from 5 to 25.

DESCRIPTION OF THE INVENTION

The bread improvement potential of endoxylanases is related to their ratio of WU-AX solubilising activity to WE-AX- and ES-AX-degrading activity and thus to their substrate selectivity (Courtin et al., 1999, Courtin et al. 2001). At the correct dosage, addition of an endoxylanase with high selectivity for WU-AX in a recipe solubilises WU-AX, increases the viscosity of the dough aqueous phase by formation of ES-AX, and beneficially impacts gas retention. Endoxylanases that preferentially hydrolyse WE-AX and ES-AX decrease the viscosity, resulting in a decreased dough stability and increased coalescence of the gas cells, and thus to lower loaf volumes (Rouau et al., 1994; Hilhorst et al., 1999; Courtin et al. 2001; Courtin and Delcour, 2002). All commercial endoxylanases used as bread improvers to date are therefore enzymes with a high selectivity for solubilisation of WU-AX. It is not recommended to use in bread recipes endoxylanase enzymes that preferentially hydrolyse WE-AX and ES-AX to low molecular weight arabinoxylan oligosaccharides (AXOS). In general, endoxylanases of the glycoside hydrolase family (GH) 11 (classification according to http://afmb.cnrs-mrs.fr/CAZY/) have a high selectivity for WU-AX, while endoxylanases of the GH10 (classification according to http://afmb.cnrs-mrs.fr/CAZY/) preferentially hydrolyse WE-AX and solubilised arabinoxylan, but have little effect on WU-AX (Moers et al. 2005).

Next to the selectivity of the endoxylanases, also the dose plays an important role. With excessive levels of endoxylanase, a large fraction of the water that is normally immobilised by AX (23% of total dough water) is liberated and can no longer be incorporated into the dough. The dough then becomes very wet and sticky during fermentation and proofing and tends to sag over the edges of baking pans. Resulting breads have brittle crumb and crust, and show a collapse of the air cells (McCleary 1986). These effects are related to excessive solubilisation of WU-AX and degradation of ES-AX and WE-AX to low molecular weight AXOS. The effect can be partly overcome by lowering the dough water content (Rouau and Moreau, 1993; Rouau et al., 1994; Courtin et al., 2001). For instance, Courtin et al. (2001) produced white wheat flour breads with high doses of either *Bacillus subtilis* endoxylanase or *Aspergillus aculeatus* endoxylanase. Although breads with acceptable structure could be made with the high levels of endoxylanases, this was only possible by lowering the water content in the dough relative to an endoxylanase-free recipe, and even then doughs with high doses of *Aspergillus aculeatus* endoxylanase had a very poor processability. Lowering the water content in dough recipes is technically not desired as it can lead to impaired hydration of the flour constituents at the beginning of kneading and is commercially not desired by the baker as the resulting breads will become drier and hence more flour is needed per kg of bread. Addition of hydrocolloids is another way of overcoming the detrimental effect of excessive water release (McCleary, 1986). This is, however, an expensive and thus commercially unattractive solution. Therefore, overdosing of endoxylanases above the optimal dose is not recommended in the art. For instance Novozymes, a commercial producer of bakery enzymes recommends the following doses for the following endoxylanase-containing bread improvement products: Pentopan Mono BG, 20-120 mg/kg flour; Pentopan Plus BG, 30-70 mg/kg flour; Pentopan 500 BG, 20-180 mg/kg flour. In addition, it is explicitly mentioned that "overdosing results in dough stickiness" (Novozymes, Cereal Food Application Sheet. Dough Conditioning. 2003-33195-04). It is therefore concluded that the prior art does not present recommendations to the use of high doses of endoxylanases for bread making.

Not only the dose and the selectivity of the endoxylanases, but also the temperature profile of the endoxylanases plays a role. It is generally acknowledged that an endoxylanase for bread making applications should have its main activity during the dough kneading phase for optimal technological performance (Qi Si et al., 1993). In this way the negative impact of WU-AX on gluten development during kneading is minimized and an optimal distribution of ES-AX over the dough is achieved (Courtin and Delcour, 2002). This implies that mesophilic endoxylanases, i.e.

endoxylanases that have their optimal temperature around 40° C., are the preferred endoxylanases for use in bread making. The majority of commercial bread making endoxylanases belong to this class of enzymes. Thermophilic endoxylanases, endoxylanases that are stable and can optimally operate at temperatures at or above 65° C. and are sub-optimally active at dough kneading temperatures ranging between 20° C. and 30° C. are for reasons of efficiency not the preferred endoxylanases for use in bread making.

Prebiotics are food ingredients that can not be digested by host enzymes of the upper gastrointestinal tract and that beneficially affect the host by selectively stimulating the growth and/or activity of a limited number of beneficial bacteria, such as Bifidobacteria and Lactobacilli, in the lower part of the gastrointestinal tract (Gibson and Roberfroid 1995). The health benefits ascribed to prebiotics include increased solubility and bio-availability of the minerals calcium and magnesium, suppression of potentially pathogenic bacteria in the colon, reduced levels of triglycerides in the blood, stimulation of the satiety response, and reduced risk for colon cancer (Macfarlane et al. 2006; Delzenne et al 2007). AXOS (Arabinoxylan oligosaccharides) with an average degree of polymerization (DP) of 3-4 have been shown to have prebiotic properties (Yamada et al., 1993). Experiments described in WO2006/002495 have provided evidence that AXOS with an intermediate average DP ranging from 5 to 50 have better prebiotic properties than AXOS with a lower or higher average DP. Addition of such AXOS preparations to the diet causes a significant increase in the number of Bifidobacteria present in the caecum of chickens, caecum of rats, and faeces of humans. In humans desired physiological effects, such as the reduction of ammonia excretion through urine and the increased excretion via faeces, are observed at doses of 2.21 g/day or even lower (WO2006/002495).

The technical problem posed was to develop baked products with a high content of water-soluble AXOS with an average DP between 5 and 50 by enzyme-mediated hydrolysis of WU-AX, while maintaining acceptable processability and product structure both of which are known to be negatively affected by excessive hydrolysis of WU-AX.

AXOS (arabinoxylan oligosaccharides) can be produced by the action of endoxylanases on arabinoxylans (AX), such as cereal AX present in the bread and pastry (baked product) ingredients. AXOS production through endoxylanase action on AX already occurs to a limited extent during current commercial making of bread and pastry products (baked products), when endoxylanases are added during the mixing step. However, due to the low doses of endoxylanases used in commercial bread- and pastry-making, the AXOS levels in current breads and pastry products are not sufficiently high to exert beneficial prebiotic effects upon ingestion of a regular portion of such product, and moreover, the average DP is too high so as for the AXOS to exert its optimal prebiotic effect.

In order to ensure the beneficial effects described in WO2006/002495, the daily consumption of AXOS with an average DP between 5 and 50 should be at least 2.21 g. The target was to develop a method for bread-making that allows to provide 2.21 g AXOS via a portion of bread corresponding to the average daily consumption of bread. In Belgium the average daily consumption of bread is 193 g per day (Euromonitor, database extract on Dec. 12, 2006; www.euromonitor.com), which corresponds to 126 g bread dry matter per day at an average dry matter (DM) content of 65.5%. Hence, to deliver via a novel type of health-promoting bread the targeted daily intake of 2.21 g of AXOS with an average DP of 5 to 50, the level of such AXOS in such bread should advantageously be at least 1.7 g/100 g DM.

The art does not provide methods for the production of baked products containing water-soluble AXOS with an average DP between 5 and 50 at levels equal to and preferably superior to 1.56 or 1.6 g/100 g DM, advantageously equal to and preferably superior to 1.7 g/100 g DM through the addition of endoxylanases to the recipe.

Provided in the invention are methods and means that allow to produce baked products with, after baking, a level of water-soluble AX with an average DP ranging from 5 to 50, preferably from 5 to 35, most preferably from 5 to 25, of at least 1.56, 1.6 g/100 g dry matter (DM), advantageously at least 1.7 g/100 g dry matter (DM) such as for instance 1.75 g/100 g DM, 1.8 g/100 g DM, 1.9 g/100 g DM or 2.0 g/100 g DM, and up to 7 g/100 g dry matter.

The methods and means of the invention make use of addition of high doses of endoxylanases.

The methods of the invention advantageously make use of addition of high doses of thermophilic endoxylanases. The combination of high dosage and thermophilic endoxylanases allows achieving high levels of AXOS, without compromising the processability of intermediate products or the technological quality of the final product. Without intending to be bound by theory, we believe that by using thermophilic endoxylanases instead of mesophilic endoxylanases, the xylanolytic activity required to produce AXOS is shifted at least in part from the kneading and leavening phase to the baking phase, thus allowing to use higher doses without incurring the negative effects of supra-optimal xylanase activity on dough and loaf structure due to excessive release of AX-bound water during kneading and leavening.

The term "baked product" refers in the context of the present invention to an unleavened, a yeast-leavened or a chemically leavened baked product of which the major ingredient is flour derived from cereal grains, and which can also contain fat or fat replacer, sugar, eggs, gluten, starch, hydrocolloids, enzymes, emulsifiers, oxidizing or reducing compounds, prebiotic compounds and/or an improver.

The term "improver" is a well known concept among bakers and refers in the context of the present invention to a mixture of at least two active ingredients such as enzymes, emulsifiers, oxidizing compounds, reducing compounds and prebiotic compounds (e.g. Galactooligosaccharides, fructooligosaccharides, xylooligosaccharides, arabinoxylan oligosaccharides, resistant starch, resistant dextrin, . . . ) which are mixed with the usual ingredients for making the baked products. The improver usually contains a carrier substance next to the active ingredients. These carrier substances can be wheat flour, soy flour, maize flour, starch or another food grade product as far as powder-form improvers are concerned. For liquid improvers the carrier can be oil, or water. It is also common in liquid improvers to add polysaccharides from microbial or vegetable origin to stabilize the liquid improver.

Examples of baked products include, without limitation, bread, flat bread, baguette, toast bread, loaf bread, ciabatta, pizza bread, pita bread, hamburger buns, brioche, hard rolls, soft rolls, cake, sponge cake, gingerbread, puff pastry, Danish pastry pie pastry and cookies.

The term "grain", in the context of the present invention, refers to seed of a plant, such as but not limited to cereals, with or without remnants of the fruit and with or without remnants of the flower.

The term "cereal", in the context of the present invention, refers to plants of the botanical family of the Poaceae, including but not limited to species such a wheat, barley, oat, spelt, rye, sorghum, maize, and rice.

The term "milling fraction", in the content of the present invention, refers to all or part of the fractions resulting from mechanical reduction of the size of grains, through, as examples but not limited to, cutting, rolling, crushing, breakage or milling, with or without fractionation, through, as examples but not limited to, sieving, screening, sifting, blowing, aspirating, centrifugal sifting, windsifting, electrostatic separation, or electric field separation.

The term "bran" in the context of the present invention, means a milling fraction from a grain enriched in any or all of the tissues to be selected from aleurone, pericarp, sepals, petals and seed coat, as compared to the corresponding intact grain. The bran used in this invention can also be extruded or pelletised, followed by milling or another form of physical homogenisation.

The term "flour" refers in the context of the present invention to a dry powder-like product produced by milling of cereal grains or grain fractions.

The term "endosperm flour" refers in the context of the present invention, to a powder obtained by milling cereal grain after removal of part or all of the bran and germ fractions and thus contains in majority the endosperm fraction of the grain. Endosperm flour typically has a mineral content (ash content) between 0.3% and 1.4% (w/w on DM), as determined by weighing the ash mass that remains after a sample is incinerated in an oven at temperatures typically between 550° C. and 900° C.

The term "wholegrain flour", in the context of the present invention, refers to a powder obtained by milling of cereal grain with or without removal of the sepals and petals, with or without removal of part of the outer pericarp layer, and with or without removal of the germ. Wholegrain flour typically has a mineral content (ash content) higher than 1.4% (w/w on DM), as determined by weighing the ash mass that remains after a sample is incinerated in an oven at temperatures typically between 550° C. and 900° C.

In the context of the present invention the term "endoxylanase" refers to an enzyme that is able to hydrolyze internal glycosyl bonds linking xylose residues in xylose-containing polysaccharides. Such glycosyl bonds can be for instance the beta-1,4-glycosyl bond in beta-D-xylopyranosyl-1,4-beta-D-xylopyranosyl units of such polysaccharides. Endoxylanases can be derived from a variety of organisms, including plant, fungal (e.g. species of *Aspergillus, Penicillium, Disporotrichum, Neurospora, Fusarium, Humicola, Trichoderma*) or bacterial species (e.g. species of *Bacillus, Aeromonas, Streptomyces, Nocardiopsis, Thermomyces, Thermotoga*) (see for example WO92/17573, WO92/01793, WO91/19782, WO94/21785). Commercially available purified or partially purified endoxylanase preparations include Frimase™ B210 (Puratos), Shearzyme™ (Novozymes), Biofeed Wheat™ (Novozymes), Pentopan™ Mono BG (Novozymes), Pentopan™ 500 BG (Novozymes), Pulpzyme™ (Novozymes), Ecopulp™ (AB Enzymes), Veron™ 191 (AB Enzymes), Veron™ Special (AB Enzymes), Multifect™ Xylanase (Genencor/Danisco), Multifect™ 720 (Genencor/Danisco), Spezyme™ CP (Genencor/Danisco), Grindamyl™ H640 (Danisco), and Grindamyl™ Powerbake™ (Danisco).

The term "high dose" in the context of the present invention refers to a dose beyond, often far beyond, a dose as one would typically use for increasing loaf volume. In the context of the invention an enzyme preparation comprising at least one endoxylanase is advantageously added to the recipe (of a baked product) in a dose which is at least 2-fold higher, e.g. at least 2.5 times higher, preferably at least 3 to 6 times higher or even 10 times higher than the dose conferring 90% of the maximal bread volume increase obtained by addition of such enzyme preparation to the recipe of said baked product.

In the context of the present invention endoxylanases, or the enzyme preparation comprising at least one endoxylanase, are preferably added in an amount such that the level of water-soluble arabinoxylans (S-AX) with an average degree of polymerization (avDP) ranging from 5 to 50, preferably from 5 to 35, most preferably from 5 to 25, in the baked products, after baking, is at least 1.56 g/100 g dry matter (DM), preferably at least 1.6 g/100 g DM, most preferably at least 1.7 g/100 g DM, for instance at least 1.75 g/100 g DM, at least 1.8 g/100 g DM, at least 1.9 g/100 g DM, or at least 2.0 g/100 g DM, up to 7 g/100 g DM. This amount is also referred to as the "sufficient amount" or as the "sufficiently effective amount".

The term "thermophilic endoxylanase" refers in the context of the present invention to an endoxylanase enzyme whose optimal temperature for activity is at least 65° C., such as between 65° C. and 70° C., or such as between 70° C. and 80° C., or such as between 80° C. and 100° C.

DETAILED DESCRIPTION OF THE INVENTION

The present invention relates to methods and means for increasing the level of water-soluble arabinoxylan oligosaccharides in baked products.

A first aspect of the invention relates to a method to increase in a baked product, advantageously after baking, the level(s) of water-soluble arabinoxylans (S-AX) with an average degree of polymerization (avDP) ranging from 5 to 50, preferably from 5 to 35, more preferably from 5 to 25 (referred to as "S-AX or arabinoxylans of the desired type"), by using a high dose of exogenously added endoxylanases. These endoxylanases advantageously are added to the recipe of a baked product, where they exert their solubilizing effect on the WU-AX present in the recipe and can hydrolyse water-soluble arabinoxylans (S-AX).

The endoxylanases (the enzyme preparation comprising at least one endoxylanase) are added to the recipe of a baked product, advantageously are added to the dough of such product, preferentially are added during the mixing step (id est they are admixed with the flour, water and other dough ingredients).

The inventors found that advantageously the dough is prepared with a flour, a mixture of flours or a mixture of flour(s) and milling fractions, such flour or such mixture having a total arabinoxylan content of at least 2.0%, more preferably at least 2.5% (w/w, % of dry weight). Below 2% and between 2.0% and 2.5% the amount of arabinoxylans in the flour, the mixture of flours or the mixture of flour(s) and milling fractions may be too low to produce the desired level of water-soluble arabinoxylan (S-AX) of the desired type.

To their surprise the inventors discovered that by adding to such dough a sufficiently high dose of an enzyme preparation comprising at least one endoxylanase, preferably comprising at least one thermophilic endoxylanase, baked products (e.g. bread) with health-promoting properties, exerting prebiotic effects on the basis of an average daily consumption, are easy to obtain and this without compromising product quality.

The health promoting effect may include one or more of the following effects: increased levels of carbohydrate-fermenting bacteria in the colon, increased levels of bacteria of the genus *Bifidobacterium* in the colon, reduced levels of protein-fermenting bacteria in the colon, increased mineral absorption in the colon, reduced levels of triglycerides and/or LDL-cholesterol in the blood plasma, increased satiety feeling, antidiabetic effect, and reduced risk of colon cancer.

Accordingly, an embodiment of the present invention concerns a method to increase in a baked product, advantageously after baking, the level of water-soluble arabinoxylan (S-AX) with an average degree of polymerization (avDP) ranging from 5 to 50, preferably from 5 to 35, most preferably from 5 to 25, preferably to a level of at least 1.56%, at least 1.6%, more preferably at least 1.7%, said method comprising the steps of:

- Preparing a dough for a baked product with a flour, with a mixture of flours or with a mixture of flour(s) and milling fractions having a total arabinoxylan content of at least 2.0%, more preferably at least 2.5%, e.g. having a total arabinoxylan content between 2.0% and 25%, preferably between 2.5% and 8%, more preferably between 3% and 8%, most preferably between 3% and 6%, and
- Adding to said dough an enzyme composition comprising at least one endoxylanase (id est one or more endoxylanases)—which endoxylanase preferably is a thermophilic endoxylanase—
- in an amount at least 2-fold higher, at least 2.5 times higher, preferably at least 3 to 6 times higher or even 10 times higher than the dose conferring 90% of the maximal bread volume increase obtained by addition of such enzyme preparation to the recipe of said baked product.

When the total arabinoxylan content is between 2% and 2.5%, it may be advantageous to combine a thermophilic endoxylanase (or an enzyme preparation comprising at least one thermophilic endoxylanase) with at least one endoxylanase highly selective for WU-AX (e.g a GH11 mesophilic endoxylanase), thermophilic or not. Both types of enzymes may be dosed separately or may be combined in one and the same enzyme preparation.

Preferably the baked products, after baking, have a level of at least 1.56% (w/w, g/100 g DM), at least 1.6%, more preferably at least 1.7% of S-AX with an avDP ranging from 5 to 50, preferably from 5 to 35, most preferably from 5 to 25.

Preferably, the A/X ratio of the S-AX is between 0.2 and 0.9, more preferably between 0.3 and 0.7, such as between 0.4 and 0.6.

Accordingly, an embodiment of the present invention concerns a method to increase in a baked product, advantageously after baking, the level of S-AX with an avDP ranging from 5 to 50, preferably from 5 to 35, most preferably from 5 to 25, said method comprising the steps of:

- Preparing a dough for a baked product with a flour, with a mixture of flours or with a mixture of flour(s) and milling fractions having a total arabinoxylan content of at least 2.5%, e.g. having a total arabinoxylan content between 2.5% and 25%, preferably between 2.5% and 8%, more preferably between 3% and 8%, most preferably between 3% and 6%, and
- Adding to said dough an enzyme preparation comprising at least one endoxylanase (id est one or more endoxylanases)—which endoxylanase preferably is a thermophilic endoxylanase—in an amount sufficient to provide in said baked product, after baking, a level of at least 1.56% (w/w, g/100 g DM), at least 1.6%, more preferably at least 1.7% of S-AX with an avDP ranging from 5 to 50, preferably from 5 to 35, most preferably from 5 to 25.

Most preferably, endoxylanases are added in an amount to obtain after baking a level of S-AX of the desired type that exceeds 1.56% e.g. is equal or higher than 1.6%, is equal or higher than 1.7%, e.g. is equal to or higher than 1.75%, equal to or higher than 1.8%, equal to or higher than 1.9%, equal to or higher than 2.0%, and up to 7%.

Preferably, a dough is prepared with flour (possibly a mixture of flours or a mixture of flour(s) and milling fraction(s) of which at least 40% (w/w), preferably at least 50%, more preferably at least 60%, most preferably at least 70% is derived from wheat.

When using a wheat endosperm flour, it is recommended to add a minimal amount of wholegrain flour or a milling fraction, in which case the milling fraction is preferably bran, most preferably bran from a cereal, e.g. at least 5% (w/w), to bring the total arabinoxylan content of the flour(s) to a level of at least 2.0%, preferably at least 2.5%, e.g. to a level between 2.0% and 25%, preferably between 2.5 and 8%, more preferably between 3% and 8%, most preferably between 3% and 6%.

The following may also be used: mixes of wheat flour and rye endosperm flour, and mixes of wheat flour and rye wholegrain flour.

Mixes can also be used consisting of flour derived from wheat, flour derived from rye and bran from a cereal or non-cereal.

Excellent results were obtained with a (100%) wheat wholegrain flour.

Excellent results were also obtained with mixes of wheat endosperm flour and bran in a ratio of 95:5 (w/w) to 75:25 (w/w), e.g. 95:5, 90:10, 85:15, or 80:20 (w/w).

Excellent results were obtained with wheat aleurone-enriched bran as bran (See Table 3) and with rye bran or rye aleurone-enriched bran (See Table 5).

The following type of bran are also possible: wheat bran, barley bran, rice bran, corn bran (also called corn hull or corn husk), psyllium bran (also called psyllium husks), cotton bran (also called cotton husk). The bran used in this invention can also be extruded or pelletised, followed by milling or another form of physical homogenisation.

Thermophilic endoxylanases and in particular GH11 thermophilic endoxylanases proved highly suitable to solubilize AX from bran and to generate the desired type of arabinoxylan. If a GH10 family thermophilic endoxylanase (e.g. XAA) is used, it may be advantageous to use in addition thereto at least one other endoxylanase, whether thermophilic or not, that is highly selective for WU-AX (e.g. a GH11 mesophilic endoxylanase or a WU-AX-specific mesophilic endoxylanase).

Excellent results were further also obtained with mixes of flours comprising for more than 75% (w/w) of flour derived from wheat and flour derived from rye in a ratio of 90:10 (w/w) to 50:50 (w/w), e.g. 90:10, 80:20, 75:25, 70:30, or 60:40 (w/w). When the ratio of flour derived from wheat to flour derived from rye is lower than 40:60 and the avDP of the S-AX of the baked product is reduced to below 50 by the addition of endoxylanases, then the texture and sensory quality of the baked product is disadvantageously affected. Again, thermophilic endoxylanases/an enzyme preparation comprising at least one thermophilic endoxylanases proved highly suitable to produce high amounts of the desired type of arabinoxylan. The thermophilic endoxylanase preferably is from the GH11 family, but it may also be from the GH10 family (or any other family).

Excellent results were also obtained with mixes of flour comprising for more than 75% (w/w) of flour derived from wheat, flour derived from rye, and rye bran, whereby the ratio of the sum of the wheat- and rye-derived flours to bran is between 95:5 (w/w) and 75:5 (w/w), e.g. 95:5, 90:10, 85:15, or 80:20 (w/w), and the ratio of wheat-derived flour to rye-derived flour is between 95:5 (w/w) and 50:50 (w/w, e.g. 95:5, 90:10, 85:15, 80:20, 75:25, 70:30, or 60:40 (w/w). Again, thermophilic endoxylanases/an enzyme preparation comprising at least one thermophilic endoxylanases proved highly suitable to produce high amounts of the desired type of arabinoxylan. The thermophilic endoxylanase preferably is from the GH11 family, but it may also be from the GH10 family (or any other family).

Preferably an enzyme preparation comprising at least one (one, two or more) thermophilic endoxylanase is added to the recipe (e.g. the dough).

Examples of such thermophilic endoxylanases include thermophilic endoxylanases from *Trichoderma longibrachiatum* (mutant form), from *Aspergillus aculeatus*, from *Thermomyces lanuginosus*, and/or from *Thermotoga maritima*. More preferably thermophilic endoxylanases from *Trichoderma longibrachiatum*, *Thermomyces lanuginosus*, and/or *Thermotoga maritima* are used.

Excellent results were e.g. obtained with a *Thermomyces lanuginosus* thermophilic (endo)xylanase preparation "Pentopan Mono BG" (PP MONO), e.g. when added in a dose of at least 240000 units/kg flour, and with the thermophilic *Trichoderma longibrachiatum* (endo)xylanase preparation "Ecopulp TX200A" (ECOP), e.g. when added in a dose of at least 13200 units/kg flour (See Tables 1 and 2).

Also the thermophilic Thermotoga maritima GH10 "XynA" endoxylanase and thermophilic Thermotoga maritima GH10 "XynB" endoxylanase preparations proved highly suitable.

Preferably at least one (one or more) endoxylanase that is highly selective for WU-AX, e.g. endoxylanases from the GH11 family, is added to the dough, such high selectivity for WU-AX being defined by a value for the substrate specificity factor $SSF_{CHROM}$, as defined in Moers et al. (2003) and Moers et al. (2005), of at least 4 or higher.

Yet thermophilic endoxylanases that are highly selective for WU-AX are most suited.

If the thermophilic endoxylanase is not highly selective for WU-AX it can be advantageously combined with one or more endoxylanases, whether thermophilic or not, that are highly selective for WU-AX.

In an embodiment according to the invention, the thermophilic endoxylanase used is one with an optimal temperature for activity between 65° C. and 70° C., preferably from the GH10, GH11 or GH8 family, yet more preferably from the GH11 family.

In another embodiment the thermophilic endoxylanase used is one with an optimal temperature for activity between 70° C. and 80° C. or between 80° C. and 100° C. Again, the endoxylanase preferably is from the GH10, GH11 or GH8 family, yet more preferably from the GH11 family.

The use of different (more than 1) thermophilic endoxylanases, or the combination of at least one thermophilic endoxylanase and at least one endoxylanase highly selective for WU-AX, was also found highly suitable.

Especially the following combinations proved very suitable: XBS+PP MONO, XPH+PP MONO, XBS+XPH+PP MONO, XPH+PP MONO+PP 500, Tm-XynB+XPH, Tm-XynB+XBS+XPH, Tm-XynA+XBS+XPH, Tm-XynB+XBS+XPH+PP MONO, and Tm-XynA+XBS+XPH+PP MONO, whereby XBS stands for a *Bacillus subtilis* GH11 endoxylanase preparation, XPH for a *Pseudoalteromonas haloplanktis* GH8 endoxylanase preparation, PP MONO for a thermophilic *Thermomyces lanuginosus* (endo)xylanase preparation, PP 500 for a *Humicola insolens* endoxylanase preparation, Tm-XynA for a thermophilic *Thermotoga maritima* GH10 XynA endoxylanase preparation and Tm-XynB for a thermophilic *Thermotoga maritima* GH10 XynB endoxylanase preparation. More preferred are the combinations XBS+XPH+PP MONO and Tm-XynB (or Tm-XynA)+XBS+XPH, and Tm-XynA (or Tm-XynB)+XBS+XPH+PP MONO which combinations resulted in an AXOS level of the desired type of 1.75 g/100 g dry matter and higher.

For recommended doses, see Table 4.

The different endoxylanases may be either dosed separately to the dough of the baked product or may be provided to said dough in the form of enzyme mixtures or enzyme preparations, possibly in the form of one or more improvers containing the different enzymes.

For baked products made on the basis of mixtures of flours comprising for more than 75% (w/w) of flour derived from wheat and flour derived from rye in a ratio of 90:10 (w/w) to 50:50 (w/w), a thermophilic GH10 endoxylanase, such as for instance XAA (a thermophilic GH10 *Aspergillus aculeatus* endoxylanase preparation), Tm-XynA or Tm-XynB, can be added to the dough, either alone or in combination with an endoxylanase that is highly selective for WU-AX.

The increase of AX levels of the desired type in baked products can also be obtained by using enzyme cocktails comprising, next to endoxylanase activity, and in particular next to thermophilic endoxylanase activity, additional enzyme activities selected from the group of alpha-L-arabinofuranosidases (which cleave off the arabinose side chains from arabinoxylan and hence increase access of endoxylanases to their substrate), methyl glucuronidases (which remove methyl glucuronic acid side chains and hence increase access of endoxylanases to their substrate), feruloyl esterases (which hydrolyse the ester bond between ferulic acid and arabinoxylan and hence increase solubilisation of arabinoxylan), beta-glucanases (which hydrolyse beta-glucans that can be associated with arabinoxylan, and hence increase access of endoxylanases to their substrate), cellulases (which hydrolyse cellulose that can be associated with arabinoxylan, and hence increase access of endoxylanases to their substrate) and proteases.

Again, alternatively, each of said enzymes may be dosed separately to the dough.

Use of the endoxylanases can also be combined with other ingredients such as gluten, starch, additives such as emulsifiers (e.g. monoglycerides, diglycerides, diacetyl tartaric acid esters of monoglycerides (DATEM), stearoyllactylates, lecithine and the like), enzymes (e.g. xylanases, alpha-amylases, lipases, oxido reductases, proteases), reducing compounds (e.g. cysteine), oxidizing compounds (e.g. ascorbic acid, azodicarbonamide and bromate), hydrocolloids and prebiotics (e.g. galactooligosaccharides, arabinooligosaccharides, xylooligosaccharides, fructooligosaccharides, inulin, resistant starch, resistant dextrins, . . . ).

It is for instance possible to include the endoxylanases in an improver composition, liquid or powder, which improver is then added to a dough (e.g. during the mixing step) or in a ready to use optimized mix (a complete mix containing 50% or 100% of the flour and all dry ingredients and additives to prepare the baked product).

The endoxylanases may herein (the improver) be further combined with at least one enzyme selected from the group consisting of endoxylanases highly selective for WU-AX, alpha-L-arabinofuranosidases, methyl glucuronidases, feruloyl esterases, beta-glucanases, and cellulases.

The advantage of (any of) the above described method(s) of the invention is that the entire amount (e.g. a level of at least 1.7% or at least 1.75%) of AX of the desired type can be produced in situ by the action of endoxylanases on (arabinoxylans) AX, such as cereal WU-AX, present in the ingredients such as the flour(s) used.

To further increase the level of the desired type of AXOS, the dough may be further supplemented with an ingredient comprising (purified or partly purified) S-AX with an avDP ranging from 5 to 50, preferably ranging from 5 to 35, more preferably ranging from 5 to 25, from an exogenous source.

Yet a further aspect of the invention concerns a method for increasing in a baked product, after baking, the level of S-AX with an avDP ranging from 5 to 50, preferably ranging from 5 to 35, more preferably ranging from 5 to 25, to a level above 1.56%, above 1.6%, preferably above 1.7%, above 1.75%, more preferably above 1.9%, such as for instance higher than 2.0%, 2.1% or higher than 2.2%, said method comprising the steps of:

Preparing a dough for a baked product with flour, a mixture of flours, or a mixture of flour(s) and milling fractions.

Adding to said dough an enzyme preparation comprising at least one endoxylanase in an amount at least 2-fold higher, preferably at least 3 to 6 times higher or even 10 times higher than the dose conferring 90% of the maximal bread volume increase obtained by addition of such enzyme preparation to the recipe of said baked product, as well as an ingredient comprising at least 8% (w/w %, on the total content) of S-AX with an avDP ranging from 5 to 50, preferably ranging from 5 to 35, more preferably ranging from 5 to 25.

Advantageously said ingredient comprises at least 10%, at least 15%, more preferably at least 20% or 30% or more of the desired type of arabinoxylans. Said arabinoxylans (from an exogenous source) may be included in an improver, in the same improver as the endoxylanases or in a separate improver.

Again, preferably at least one thermophilic endoxylanase (or an enzyme preparation comprising at least one thermophilic endoxylanase) is added to the dough.

According to an embodiment, in addition at least one enzyme selected from the group consisting of alpha-L-arabinofuranosidases, methyl glucuronidases, feruloyl esterases, beta-glucanases, cellulases and endoxylanases highly selective for WU-AX is added to the dough.

Said enzymes may be combined in a single enzyme preparation or may each be dosed separately to the dough, possibly in the form of an improver.

The different enzymes and in particular the endoxylanases may be combined with ingredients such as gluten, starch, additives such as emulsifiers (e.g. monoglycerides, diglycerides, diacetyl tartaric acid esters of monoglycerides (DATEM), stearoyllactylates, lecithine and the like), enzymes (e.g. xylanases, alpha-amylases, lipases, oxido reductases, proteases), reducing compounds (e.g. cysteine), oxidizing compounds (e.g. ascorbic acid, azodicarbonamide and bromate), hydrocolloids and prebiotics (e.g. galactooligosaccharides, arabinooligosaccharides, xylooligosaccharides, fructooligosaccharides, inulin, resistant starch, resistant dextrins, . . . ).

It is for instance possible to include the endoxylanases in an improver composition, liquid or powder, which improver is then added to a dough (e.g. during the mixing step) or in a ready to use optimized mix (a complete mix containing 50% or 100% of the flour and all dry ingredients and additives to prepare the baked product).

When supplementing the dough with said exogenous S-AX (AXOS), it is not absolutely necessary to use a flour (possibly a mixture of flours or a mixture of flour(s) and milling fraction(s) having a total arabinoxylan content of at least 2.0%, preferably at least 2.5% (w/w, % of dry weight). Yet, as documented above with such flour(s) higher AXOS levels of the desired type will be generated. Any of the flours described thus far (in any of the previous embodiments) may be used in said method according to the invention.

A further aspect of the invention concerns a baked product obtainable by a method (any of the above methods) according to the invention. Such baked product, especially one which after baking has an AXOS level of the desired type of at least 1.56%, more preferably 1.7%, is further referred to as a "baked product according to the invention".

A further aspect of the invention concerns a composition (such as an enzyme preparation) comprising at least one thermophilic endoxylanase and at least one endoxylanase highly selective for WU-AX (e.g. a mesophilic GH11 endoxylanase), possibly combined with at least one enzyme selected from the group consisting of alpha-L-arabinofuranosidases, methyl glucuronidases, feruloyl esterases, beta-glucanases and cellulases. Another aspect of the invention concerns an improver composition, liquid or powder, or a ready to use optimized mix comprising said endoxylanase(s), more in particular comprising at least one thermophilic xylanase, possibly in combination with at least one endoxylanase highly selective for WU-AX or at least one enzyme selected from the group consisting of alpha-L-arabinofuranosidases, methyl glucuronidases, feruloyl esterases, beta-glucanases and cellulases.

An aspect of the invention concerns a composition comprising at least one thermophilic endoxylanase and at least one endoxylanase highly selective for WU-AX or at least one enzyme selected from the group consisting of alpha-L-arabinofuranosidases, methyl glucuronidases, feruloyl esterases, beta-glucanases and cellulases, which composition is suitable for the preparation of a baked product according to the invention. Yet another aspect of the invention concerns a composition suitable for the preparation of a baked product according to the invention, said composition comprising at least one endoxylanase—more in particular at least one thermophilic xylanase, possibly in combination with at least one endoxylanase highly selective for WU-AX or at least one enzyme selected from the group consisting of alpha-L-arabinofuranosidases, methyl glucuronidases, feruloyl esterases, beta-glucanases and cellulases—and comprising one or more, preferably at least 2 other ingredients selected from the group consisting of gluten, starch, additives such as emulsifiers (e.g. monoglycerides, diglycerides, diacetyl tartaric acid esters of monoglycerides (DATEM), stearoyllactylates, lecithine and the like), enzymes (e.g. xylanases, alpha-amylases, lipases, oxido reductases, proteases), reducing compounds (e.g. cysteine), oxidizing compounds (e.g. ascorbic acid, azodicarbonamide and bromate) hydrocolloids and prebiotics (e.g. galactooligosaccharides, arabinooligosaccharides, xylooligosaccharides, fructooligosaccharides, inulin, resistant starch, resistant dextrins, . . . ).

The (improver) composition(s) according to the present invention is in particular suited for the preparation of baked products, which after baking, have a level of AXOS of the desired type that advantageously is equal to or higher than 1.56%, 1.6% or preferably 1.7%, e.g. is at least 1.75%, 1.8%, 1.9%, 2.0%, up to 7%. "Suitable for" in the present context means that the amount of endoxylanases in said improver is a multiple (at least factor 1, the factor being preferably between 1 and 200, more preferably between 10 and 100, most preferably between 20 and 50) of the amount defined in the context of the invention as a "high dose" or as "a sufficient amount", so that after mixing of the improver with the other ingredients in the recipe a "high dose" or a "sufficient amount" of the endoxylanases is achieved in the final recipe.

Yet a further aspect concerns a dough, especially a dough for a baked product according to the invention, comprising flour, a mixture of flours or a mixture of flour(s) with milling fractions with preferably a total arabinoxylan content of at least 2.0%, preferably at least 2.5% (w/w), preferably between 2.0% and 25%, more preferably between 2.5% and 8%, most preferably between 3% and 6% (w/w), and comprising an amount of at least one endoxylanase sufficient to provide, after baking, a baked product with a level of water-soluble arabinoxylan with an average degree of polymerization ranging from 5 to 50, preferably from 5 to 35, most preferably from 5 to 25 that is at least equal to, preferably superior to 1.56% or 1.6%, more preferably 1.7% or 1.75%, such as superior to 1.8%, 1.9% or 2.0%.

Preferably, as mentioned above, endoxylanase preparations used in said dough comprise at least one endoxylanase, preferably at least one thermophilic endoxylanase, possibly in combination with at least one endoxylanase highly selective for WU-AX, with alpha-L-arabinofuranosidases, methyl glucuronidases, feruloyl esterases, beta-glucanases and and/or cellulases. Alternatively, each of said enzymes may be dosed separately to the dough.

Preferably, the dough is prepared with flour (possibly a mixture of flours or a mixture of flour(s) and milling fraction(s) of which at least 40%, at least 50%, more preferably at least 60%, most preferably at least 70% is derived from wheat.

Excellent results were obtained with a (100%, w/w) wheat wholegrain flour and with mixes of wheat endosperm flour and bran in a ratio of 95:5 (w/w) to 75:25 (w/w), e.g. 95:5, 90:10, 85:15 and 80:20. Excellent results were obtained with wheat aleurone as bran (See Table 4) and with rye bran (See Table 5), but the following type of bran would also be possible: rye aleurone, wheat bran, barley bran, rice bran, corn bran, psyllium bran, or cotton bran.

Excellent results are also obtained with mixes of flour comprising for more than 75% (w/w) of flour derived from wheat and flour derived from rye in a ratio of 90:10 (w/w) to 50:50 (w/w), e.g. 90:10, 80:20, 75:25, 70:30, or 60:40 (w/w).

Excellent results were also obtained with mixes of flour comprising for more than 75% (w/w) of flour derived from wheat, flour derived from rye, and rye bran, whereby the ratio of the sum of the wheat- and rye-derived flours to bran is between 95:5 (w/w) and 75:5 (w/w), e.g. 95:5, 90:10, 85:15, or 80:20 (w/w), and the ratio of wheat-derived flour to rye-derived flour is between 95:5 (w/w) and 50:50 (w/w, e.g. 95:5, 90:10, 85:15, 80:20, 75:25, 70:30, or 60:40 (w/w).

In an embodiment according to the invention the dough is further supplemented with S-AX of the desired type from an exogenous source, possibly by adding an ingredient comprising at least 8%, more preferably at least 10%, at least 15%, more preferably at least 20% or 30% or more of the desired type of arabinoxylans.

Still a further aspect concerns baked products enriched in endogenous water-soluble AX.

In particular, the invention relates to such baked products that advantageously comprise a preparation of endoxylanases comprising at least one thermophilic endoxylanase, whether in native or denatured form, resulting (after baking) in a level of at least 1.7%, e.g. at least 1.75%, and up to 7% of water-soluble AX with an average DP ranging from 5 to 50, preferably from 5 to 35, most preferably from 5 to 25.

Preferably, the A/X ratio of the S-AX is between 0.2 and 0.9, more preferably between 0.3 and 0.7, such as between 0.4 and 0.6.

As mentioned above, the desired amount of the desired type of arabinoxylans can be obtained entirely by enzyme-mediated hydrolysis of AX present in the recipe of the baked product.

The AX present in the flour have been rendered physiologically more active by the treatment with a sufficiently effective amount of a preparation of endoxylanases comprising at least one thermophilic endoxylanase.

Such baked products advantageously are products with improved health benefits.

The baked products according to the invention have an acceptable product structure despite the use of high doses of endoxylanases which was believed to negatively affect dough processability and product structure.

Supplementation with AXOS from an exogenous source is not excluded and may be recommended in cases where AX levels of the desired type equal to or higher than 1.9%, such as for instance higher than 2.0%, 2.1% or higher than 2.2%, are desired, irrespective of the type of flour(s) used. Also such baked products, wherein the major part (at least 50%, 60% more preferably at least 70%) of the desired type of AXOS are set free from (endogenous) AX present in the flour(s) used, had an acceptable product structure. Once more, preferably thermophilic endoxylanases are used.

The invention is further illustrated by way of the non-limiting illustrative embodiments described below.

FIGURE LEGENDS

FIG. 1 shows a picture of slices from the middle of a control wheat endosperm flour bread (left), a wheat endosperm flour bread containing 0.4 ml/kg flour of Ecopulp TX200A (middle) and a wheat endosperm flour bread containing 0.4 ml/kg flour of Ecopulp TX200A and 10 g/kg flour of an AXOS-rich preparation.

Figure 2A:
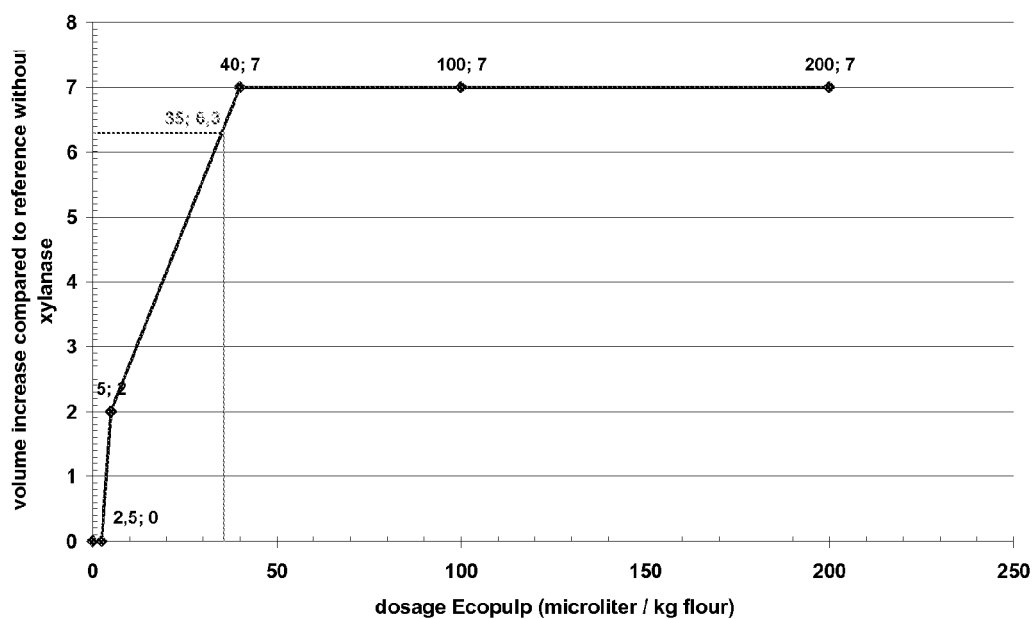

FIGS. 2A and B show the bread volume increase (compared to reference bread prepared without endoxylanase) in function of different dosages of (A) Ecopulp® TX200A and (B) Pentopan® Mono. The dose conferring 90% of the maximal bread volume increase obtained by addition of such enzymes to the recipe of said baked product is indicated.

EXAMPLES

Example 1

Materials:

Frimase® B210 (XBS) is a commercial food-grade endoxylanase preparation from Puratos (Groot-Bijgaarden, Belgium) produced through expression in *Bacillus subtilis* of a *Bacillus subtilis* GH 11 endoxylanase gene.

Frimase®218 (XPH) is a commercial food-grade endoxylanase preparation from Puratos (Groot-Bijgaarden, Belgium) produced through recombinant expression of a *Pseudoalteromonas haloplanktis* GH8 endoxylanase gene.

Grindamyl® Powerbake® (GRIN PB) is a commercial food-grade endoxylanase preparation from Danisco (Copenhagen, Denmark) produced through expression in *Bacillus subtilis* of a non-inhibited mutant of a *Bacillus subtilis* GH 11 endoxylanase gene.

Ecopulp® TX200A (ECOP) is a commercial technical grade endoxylanase preparation from AB Enzymes (Darmstadt, Germany) produced through recombinant expression of a thermophilic mutant of a *Trichoderma longibrachiatum* GH11 endoxylanase gene.

Multifect® Xylanase (MF XYL) is a commercial technical grade endoxylanase preparation from Genencor/Danisco (Palo Alto, USA) produced through recombinant expression of a *Trichoderma longibrachiatum* GH11 endoxylanase gene.

Shearzyme® 500L (XAA) is a commercial food-grade endoxylanase preparation from Novozymes (Bagsvaerd, Denmark) prepared by recombinant expression in *Aspergillus oryzae* of an *Aspergillus aculeatus* GH10 endoxylanase gene.

Tm-XynA is a non-commercial preparation produced by recombinant expression of a *Thermotoga maritima* GH10 XynA endoxylanase gene.

Tm-XynB is a non-commercial preparation produced by recombinant expression of a *Thermotoga maritima* GH10 XynB endoxylanase gene (Jiang et al. 2001).

Pentopan® Mono BG (PP MONO) is a commercial food-grade endoxylanase preparation from Novozymes (Bagsvaerd, Denmark) prepared by recombinant expression in *Aspergillus oryzae* of a *Thermomyces lanuginosus* GH11 endoxylanase gene.

Pentopan® 500 BG (PP 500) is a commercial food-grade endoxylanase preparation from Novozymes (Bagsvaerd, Denmark) prepared by non-recombinant production by *Humicola insolens*.

The properties of these different enzymes are summarized in Table 1.

Wheat endosperm (white) flour (Surbi®) was obtained from Dossche Mills & Bakery (Deinze, Belgium).

Wheat wholegrain flour (Integraal Cylinder®) was obtained from Ceres (Brussels, Belgium).

Wheat aleurone (Grainwise®), a wheat aleurone-enriched bran, was purchased from Horizon Milling (Minneapolis, USA).

Rye bran (Rogge kleie) was obtained from Plange Mühle (Dusseldorf, Germany).

Rye aleurone (rye aleurone-enriched bran) was obtained through rye milling as a shorts-like milling fraction that was finer than bran but coarser and browner than endosperm flour).

Analytical Techniques:

Determination of the AX content and the average DP of AX was performed based on the method of Courtin et al. 2000 (Journal of Chromatography A, 866, 97-104).

A slice of bread was taken from the middle of the loaf and the slice was dried for 12 hour in an oven at 105° C., followed by cooling to room temperature in an exsiccator for 1 hour.

The dried bread slice was homogenized using a mortar and pestle to yield a dried bread powder. For determination of total AX content of bread, 20 mg of dried bread powder was hydrolyzed by suspending in 5 ml 2.0 M trifluoroacetic acid (2.0 M) and incubation at 110° C. for 60 minutes.

After the hydrolysis, the mixture was filtered and 3.0 ml of the filtrate was further treated by adding 1.0 ml of an internal standard solution (100 mg beta-D-allose in 100 ml of a 50% saturated benzoic acid solution), 1.0 ml of ammonia solution (25% v/v) and 3 drops of 2-octanol.

The monosaccharides were reduced to alditols by addition of 200 µl of sodium borohydride solution (200 mg sodium borohydride in 1.0 ml 2 M ammonia) and the sample was incubated for 30 minutes at 40° C. The reaction was stopped by addition of 400 µl of glacial acetic acid. For the acetylation reaction, 500 µl of the sample containing the alditols was added to 5.0 ml of acetic anhydride and 500 µl of 1-methyl-imidazole. After 10 minutes, the excess of acetic anhydride was removed by addition of 900 µl ethanol to the sample. Alditol acetates were then concentrated in the organic phase by addition of water (10 ml) and potassium hydroxide solution (2 times 5.0 ml of 7.5 M solution, with an intermediate rest of a few minutes). Bromophenol blue solution (500 µl, 0.04% w/v) was added as indicator for the aqueous phase. Aliquots of 1 µl of the organic phase containing the formed alditol acetates were separated by gas chromatography on a Supelco SP-2380 polar column (30 m×0.32 mm I.D.; 0.2 µm film thickness) (Supelco, Bellefonte, Pa., USA) in an Agilent chromatograph (Agilent 6890 series, Wilmington, Del., USA) equipped with autosampler, splitter injection port (split ratio 1:20) and flame ionisation detector.

Separation during gas chromatography was at 225° C. with injection and detection at 270° C.

The purified monosaccharides D-galactose, D-xylose, and L-arabinose were treated in parallel with each set of samples for calibration purposes.

For determination of the water-soluble AX content of bread, bread extract was prepared by mixing two grams of the dried bread powder with 20 ml of water and 120 µl of Termamyl 120L (commercial amylase preparation from Novozymes, Bagsvaerd, Denmark). Termamyl 120L was treated for 1 h at 90° C. immediately prior to use in order to destroy any residual endoxylanase activity. The suspension was incubated for 30 minutes under constant shaking at 37° C., centrifuged at 3000×g during 15 minutes at 4° C. and the supernatant was stored at −20° C. until analysis. An aliquot of 2.5 ml of the bread extract supernatant was mixed with 2.5 ml of trifluoroacetic acid (4.0 M) and hydrolysis, reduction, acetylation, and gas chromatography analysis of the alditol acetates was performed as described above.

For determination of the average DP of water-soluble AX in bread, an aliquot of 2.5 ml of the bread extract supernatant was treated by adding 500 µl of an internal standard (100 mg beta-D-allose in 100 ml of a 50% saturated benzoic acid solution), 50 µl ammonia solution (25% v/v) and 9 drops of 2-octanol. The saccharides were reduced to alditols by addition of 200 µl of sodium borohydride solution (200 mg sodium borohydride in 1.0 ml 2 M ammonia) and the sample was incubated for 30 minutes at 40° C. The reaction was stopped by the addition of 400 µl glacial acetic acid. An aliquot of 2.5 ml of the sample containing reduced saccharides was hydrolyzed by addition of 500 µl trifluoroacetic acid (99%) and the sample was incubated at 110° C. for 60 minutes. After hydrolysis, acetylation and gas chromatography analysis was performed as described above. The purified monosaccharides D-xylose, and L-arabinose were treated in parallel with each set of samples for calibration purposes.

The total AX (T-AX) content of bread was calculated using formula (1). The water-soluble AX (S-AX) content of the samples was calculated using formula (2). The average degree of polymerisation of S-AX (avDP S-AX) was calculated using formula (3).

$$T\text{-}AX = 0.88 \times (\% \text{ arabinose dried bread} - 0.7 \times \% \text{ galactose bread extract} + \% \text{ xylose dried bread}) \quad (1)$$

$$S\text{-}AX = 0.88 \times (\%\text{ arabinose bread extract} - 0.7 \times \%\text{ galactose bread extract} + \%\text{ xylose bread extract}) \quad (2)$$

$$avDP\ S\text{-}AX = (\%\text{ arabinose bread extract} - 0.7 \times \%\text{ galactose bread extract} + \%\text{ xylose bread extract})/\%\text{ reducing end xylose bread extract} \quad (3)$$

The subtraction of the % galactose in formulae (1), (2) and (3) is meant as a correction for the water-soluble arabinogalactan content in cereals (Loosveld et al. 1998).

Baking tests:

Breads were prepared by mixing 1500 g flour (as specified in the Tables) in a mixer with 30 g salt, 30 g baker's yeast (obtained from Algist Bruggeman, Gent, Belgium), 30 g of a xylanase-free bread improver mix (1 g/100 kg flour of alpha-amylase (Bel'Ase A75, Beldem, Belgium), 300 g/100 kg flour of Datem (MULTEC data HP20, Beldem, Belgium)) and 15 g/100 kg flour of ascorbic acid), the appropriate amount of water (as specified in the Tables), and the appropriate amount of endoxylanase preparations (as specified in the Tables). For wholegrain wheat breads, 45 g of wheat gluten was added in addition to the recipe based on 1500 g flour. After mixing, the doughs were divided in pieces of 600 g, rounded manually and allowed to rise at room temperature for 20 minutes, followed by mechanical moulding, panning, and fermentation proofing (90 minutes at 35° C. and 95% relative humidity). Doughs were baked at 230° C. for 35 minutes. Two hours after baking, loaf volumes were measured through the rapeseed displacement method.

Bread Texture Analysis:

Breadcrumb firmness was determined 24 hours and 168 hours after baking with a texture analyzer (TA-XTplus, StableMicroSystems, Surrey, UK). Four adjacent bread slices of 10 mm were taken from the middle part of the sliced bread and put in the middle of the base plate of the texture analyzer. The probe (diameter=25 mm) compressed the crumb 10 mm at a speed of 2 mm/sec and maintains this compression during 20 seconds. Force is registered as a function of time. Crumb firmness is the force applied to obtain the target deformation. Elasticity is the ratio (expressed in percent) between the force measured after 20 s at constant deformation to the force applied to obtain the target deformation. The evolution of crumb firmness after 168 h made it possible to quantify staling. Measurements were performed with 8 replicates per bread type, 2 breads per type and 4 measurements on each bread (CV<8%).

Determination of the Activity of the Xylanolytic Enzymes:

The activity of the xylanolytic enzymes was measured calorimetrically using Xylazyme AX (Megazyme, Bray, Ireland) as an insoluble substrate according to manufacturer's instructions for the assay, using a 25 mM sodium acetate (pH5.5) as a buffer and an incubation for 10 minutes at 35° C. One unit was defined as the amount of enzyme required to yield a change in extinction at 590 nm of 1.0 under the assay conditions over a period of 60 minutes.

Different commercial endoxylanases (see overview Table 1) were tested for their ability to generate AXOS in situ during the breadmaking process. The enzymes were tested at doses far superior to doses typically used for increasing loaf volume and softening bread crumb, which are typically around 0.04 g of commercial solid enzyme preparation per kg flour or 0.04 ml of a commercial liquid enzyme preparation per kg flour.

Water-soluble AX (S-AX) levels superior to 1.7% (w/w %, g/100 g dry matter) and an average degree of polymerisation (avDP) lower than 25 were obtained in wheat wholegrain breads made by addition of at least 240000 units/kg flour of the Thermomyces lanuginosus thermophilic (endo)xylanase preparation "Pentopan Mono BG" or at least 13200 units/kg flour of the *Trichoderma longibrachiatum* thermophilic (endo)xylanase preparation "Ecopulp TX200A" (Table 2). Surprisingly, despite the very high enzyme doses used and the significant breakdown of AX to low molecular weight AXOS in these breads, the doughs were still processable, the loaves were increased in volume by more than 10% compared to enzyme-free control, and the breads showed no significant reduction in water content.

Addition of Multifect Xylanase, a non-thermophilic endoxylanase from *T. longibrachiatum* in wheat wholegrain bread at up to 120000 units/kg flour released only 1.28% (w/w on DM) of S-AX with an avDP of 53, versus an S-AX content of 1.82% (w/w) and an avDP of 28 for bread made with 13200 units/kg flour of the thermophilic *T. longibrachiatum* endoxylanase (Ecopulp TX200A). This indicates that thermophilicity of the endoxylanase is an important attribute for its use to generate high levels of AXOS during the breadmaking process.

In a subsequent series of tests, different types of flour were prepared with 36000 units/kg flour of the thermophilic endoxylanase Ecopulp TX200A. The tested flours included wheat endosperm flour (white flour), wheat wholegrain flour, and wheat endosperm flour/wheat aleurone flour mixtures at 95/5, 90/10 and 85/15 w/w ratios (Table 3).

The lowest level of S-AX was released by Ecopulp TX200A in the wheat endosperm flour bread (1.51% w/w). In wheat wholegrain flour breads as well as in the wheat endosperm flour/wheat aleurone flour breads, Ecopulp TX200A released more than 1.7% (w/w) S-AX with an average degree of polymerisation (avDP) lower than 25.

Breakdown of AX to low molecular weight AXOS by addition to the dough of the high dose of thermostable endoxylanase(s) was not accompanied by undesirable changes in texture or sensory properties of the bread. The crumb firmness measured 1 day after baking was decreased in all bread types to which the endoxylanase was added relative to the corresponding control bread (Table 3). The crumb firmness measured 7 days after baking, as a measure for bread staling, was slightly increased in endoxylanase-containing wheat endosperm flour bread versus the corresponding control bread. Unexpectedly, addition of the endoxylanase to either wholegrain breads or to the wheat endosperm flour/wheat aleurone flour breads, which all had a higher total AX content than the wheat endosperm flour bread, resulted in drastically reduced crumb firmness after 7 days (Table 3). This indicates that the method for obtaining high levels of S-AX with low avDP by addition of a high dose of a thermostable endoxylanase to breads with an increased cereal bran content unexpectedly and advantageously results in a lowering of bread staling.

In a third series of experiments combinations of enzymes with different optimal temperatures were tested on wheat wholegrain breads. Combinations containing at least one thermophilic endoxylanase, S-AX levels exceeding 1.7% (w/w) with avDP below 25 were obtained. Examples are combinations of XBS+XPH+PP MONO, XPH+PP MONO+PP 500, Tm-XynB+XPH, Tm-XynB+XBS+XPH, Tm-XynA+XBS+XPH, Tm-XynB+XBS+XPH+PP MONO, and Tm-XynA+XBS+XPH+PP MONO (Table 4). The combination including the thermophilic glycoside hydrolase family 10 enzyme Tm-XynB from *Thermotoga maritima* yielded particularly low avDP levels of the S-AX.

In a fourth series of experiments the thermophilic endoxylanase Ecopulp TX200A and a combination of XBS+XPH+PP MONO were tested on breads made from a mixture of wheat endosperm flour and rye bran at ratios of 85/15 (w/w)

and 80/20 (w/w), or a mixture of wheat endosperm flour and rye aleurone (aleurone-enriched rye bran). In all cases an S-AX level well in excess of 1.7% (w/w on DM) was achieved and the avDP of S-AX was equal to or below 35 (Table 5). The use of Ecopulp TX200A in bread made on the basis of wheat endosperm flour/rye bran (80/20) resulted in an S-AX content of 2.4% (w/w).

Example 2

Materials:

Specifications of the enzymes used are provided in example 1 and Table 1.

Rye endosperm flour type 1150 and rye flour type 1740 were purchased from Plange Mühle (Düsseldorf, Germany). The wheat endosperm (white) flour was either type 550 from Plange Mühle or brand Surbi®) from Dossche Mills & Bakery (Deinze, Belgium). The rye bran was the Rye Bran Beaten brand from Hildebrandmühlen (Frankfurt, Germany).

Analytical Techniques:

Determination of the T-AX, S-AX content and the average DP of S-AX were performed as described in example 1.

Baking Tests:

Breads prepared with a mixture of 70% rye endosperm flour type 1150 and 30% wheat endosperm flour type 550 were prepared by mixing 1050 g rye flour, 450 g wheat flour, 33 g salt, 37.5 g yeast (Algist Bruggeman, Gent, Belgium), 73.5 g sourdough (Aroldo, Puratos, Belgium), 1245 g water, and the appropriate amount of endoxylanase preparations (as specified in the Table 6). Mixing was done for 5 minutes at low speed and 3 minutes at high speed. After 15 minutes mass fermentation (25° C.) the dough was divided in two pieces of 1200 g, manually moulded, placed in wooden baskets and proofed for 55 minutes (30° C., 75% relative humidity). After demoulding and resting for 5 minutes dough pieces were baked in a deck oven (Miwe, Germany) for 4 minutes at 260° C./240° C. (upper oven temperature/floor oven temperature) with injection of 0.8 l steam during the first minute, and for 41 minutes at 230° C./220° C.

Breads with 70%, 75% or 80% wheat endosperm flour (Surbi®) and added rye flour and/or rye bran were prepared by mixing 1500 g flour and/or bran (as specified in the Table 7) in a mixer with 30 g salt, 30 g baker's yeast (obtained from Algist Bruggeman, Gent, Belgium), 45 g of wheat gluten, 30 g of a xylanase-free bread improver mix (1 g/100 kg flour of alpha-amylase (Bel'Ase A75, Beldem, Belgium), 300 g/100 kg flour of Datem (MULTEC data HP20, Beldem, Belgium)) and 15 g/100 kg flour of ascorbic acid), the appropriate amount of water (as specified in the Tables), and the appropriate amount of endoxylanase preparations (as specified in the Tables). After mixing, the doughs were divided in pieces of 600 g, rounded manually and allowed to rise at room temperature for 20 minutes, followed by mechanical moulding, panning, and fermentation proofing (90 minutes at 35° C. and 95% relative humidity). Doughs were baked at 230° C. for 35 minutes.

Bread volume was measured 2 hours after baking by the rapeseed displacement method.

Determination of the Activity of the Xylanolytic Enzymes:

The activity of the xylanolytic enzymes was measured as described in example 1.

Breads were made on the basis of a mixture of wheat endosperm flour and rye endosperm flour in a ratio of 30/70 (w/w), with and without addition of different endoxylanases (Table 6). The bread without addition of endoxylanase had already a high content in S-AX of 2.36% (w/w on DM), but also had a high avDP of 295. Addition of the non-thermophilic endoxylanase Frimase B210 (XBS) at 0.12 g/kg flour, a dose well superior to the dose typically recommended for increasing loaf volume and softening bread crumb (around 0.04 g), further increased the S-AX level but did not result a lowering of the avDP to below 50 (Table 6). Addition of the thermophilic GH10 endoxylanase Shearzyme 500L (XAA) and addition of the thermophilic endoxylanase GH11 endoxylanase Ecopulp TX200A (ECOP) both further increased the S-AX level (2.74% and 3.05% of DW, respectively) and resulted in an avDP lower than 50. However, it was observed that the wheat/rye flour breads prepared with the high doses of thermophilic endoxylanases had a poorer texture and sensory quality than the corresponding endoxylanase-free bread. The wheat/rye dough containing Ecopulp TX200A had a weak consistency and tended to flow out, the width of the breads became wider and the breads were less high, and the breads showed a drastically increased and thus undesired crumb firmness 7 days after baking compared to the corresponding control bread (Table 6). The wheat/rye bread containing Shearzyme 500L had a water content that was reduced by about 10% compared to that of the corresponding control bread, which is undesired (Table 6).

Breads were made on the basis of a mixture of wheat endosperm flour and rye flour in a ratio of 70:30 and the following enzymes or enzyme combinations were added: the thermophilic endoxylanase Shearzyme 500L in combination with XBS, the thermophilic endoxylanase Shearzyme 500L in combination with XPH, and the thermophilic endoxylanase Tm-XynB from *Thermotoga maritima*. The breads with added endoxylanases had an S-AX level superior to 2.0% (w/w on DM) and an avDP between 5 and 50 (Table 7). Unlike for the breads made a mixture of wheat endosperm flour and rye flour in a ratio of 30/70 (w/w), the enzyme-treated breads made with a mixture of wheat endosperm flour and rye flour in a ratio of 70:30 did not suffer from deterioration of neither texture nor sensory properties. On the contrary, both the crumb firmness after 1 day and after 7 days were lower than that of the enzyme-free control (Table 7). The doughs had acceptable consistency and processability compared to the enzyme-free control.

Levels of S-AX above 2.0% and avDP of the S-AX between 5 and 50 were also obtained in breads made with a mixture of wheat endosperm flour and rye flour in a ratio of 75:25 and treated with either a combination of PP MONO+XBS, PP MONO+XPH, or PP MONO+XBS+XPH (Table 7).

In a another series of experiments the thermophilic endoxylanase Ecopulp TX200A and a combination of XBS+XPH+PP MONO were tested on breads made from a mixture of wheat endosperm flour and rye flour in a ratio of 75:25 (w/w), a mixture of wheat endosperm flour, rye flour, and rye bran at a ratio of 80:10:10 (w/w), or a mixture of wheat endosperm flour, rye flour, and rye bran at a ratio of 75:15:10 (w/w). In all cases an S-AX level well in excess of 1.9% (w/w on DM) was achieved and the avDP of S-AX was equal to or below 33 (Table 7). The doughs had good consistence and processability. The enzyme-treated wheat flour/rye flour breads and the enzyme-treated wheat flour/rye flour/rye bran breads had crumb firmness values (either measured after 1 day or after 7 days) that were lower than those of an enzyme-free control bread made with 100% wheat endosperm flour (Table 7).

Example 3

Materials:

Specifications of the enzymes used are provided in example 1 and Table 1.

Wheat endosperm (white) flour (Surbi®) was obtained from Dossche Mills & Bakery (Deinze, Belgium).

Preparation of an AXOS-rich ingredient was done as follows. A suspension of wheat bran in water (1:7 w/v) was first treated with a thermostable α-amylase (Termamyl 120LS, Novozymes, Bagsvaerd, Denmark; 1 µl/g wheat bran) for 90 min at 90° C. under continuous stirring to hydrolyse the starch. The suspension was filtered and the filtrate discarded. The residue was resuspended in water (1:7 w/v) and incubated under continuous stirring for 8 h at 52° C. with a GHF11 endoxylanase from Bacillus subtilis (Grindamyl H640, Danisco, Denmark) at 11 units per g destarched bran. After endoxylanase treatment, the suspension was filtered with recovery of the filtrate. After inactivation of the enzyme by treatment (90° 10 min), the solution was concentrated till 20% dry matter in a falling film evaporator and finally dried in a spray-drier. The preparation had a content of water-soluble AX of 58%, and the S-AX had an avDP of 9 and an average degree of arabinose substitution of 0.25.

Analytical Techniques:

Determination of the T-AX, S-AX content and the average DP of S-AX were performed as described in example 1.

Baking Tests:

Baking tests were performed as described in example 1. The appropriate amount of water, endoxylanase preparation and AXOS preparation in the dough recipe were as specified in the Tables.

Determination of the Activity of the Xylanolytic Enzymes:

The activity of the xylanolytic enzymes was measured as described in example 1.

To reach the target amount of 1.7% S-AX with an average degree of polymerisation (avDP) between 5 and 50 is difficult to achieve with just endoxylanase addition in bread made from flour with a total AX content of less than 2.0% or less than 2.5%, e.g. bread made on the basis of wheat endosperm flour, even when using high doses of endoxylanases (see also Table 3). Provided in the present invention is a method to advantageously use high doses of endoxylanase in wheat flour bread, in combination with addition of an exogenous source of AXOS with an average DP between 5 and 50. The method unexpectedly results in bread with a very high S-AX level with an average DP between 5 and 50 and showing no undesired texture or sensory properties.

Breads were made from wheat endosperm flour either without addition of an AXOS-rich preparation or endoxylanase enzymes (control), with addition of 52800 units/kg flour of the thermophilic endoxylanase Ecopulp TX200A, and with addition of 52800units/kg flour of Ecopulp TX200A and 10 g/kg flour of an AXOS-rich preparation isolated from wheat bran and containing 58% S-AX with an avDP of 9.

The bread with the high dose of endoxylanase contained 1.69% (w/w) of S-AX with an avDP of 24, whereas the bread containing the high dose of endoxylanase and the AXOS-rich preparation contained 2.19% (w/w) of S-AX with an avDP of 18 (Table 8). The bread with the high dose of endoxylanase and the AXOS-rich preparation showed a volume increase of 13% versus the control bread and a fully normal crumb texture (FIG. 1).

Example 4

Materials:

Ecopulp® TX200A (ECOP) is a commercial technical grade endoxylanase preparation from AB Enzymes (Darmstadt, Germany) produced through recombinant expression of a thermophilic mutant of a Trichoderma longibrachiatum GH11 endoxylanase gene.

Pentopan® Mono BG (PP MONO) is a commercial food-grade endoxylanase preparation from Novozymes (Bagsvaerd, Denmark) prepared by recombinant expression in Aspergillus oryzae of a Thermomyces lanuginosus GH11 endoxylanase gene.

Wheat wholegrain flour (Integraal Cylinder®) was obtained from Ceres (Brussels, Belgium).

Baking Trials:

Baking trials were performed as explained in Example 1 and using wheat wholegrain flour and 67% (w/w) water on the flour. Different dosages of Ecopulp® TX200A (ECOP): respectively 0; 2.5; 5; 40; 100; 200 microliter/kg flour and Pentopan® Mono BG (PP MONO): respectively 0; 80; 200; 400; 800 mg/kg flour have been added to the dough.

Bread volume has been evaluated, two hours after baking, by the rapeseed displacement method.

Figure 2B:
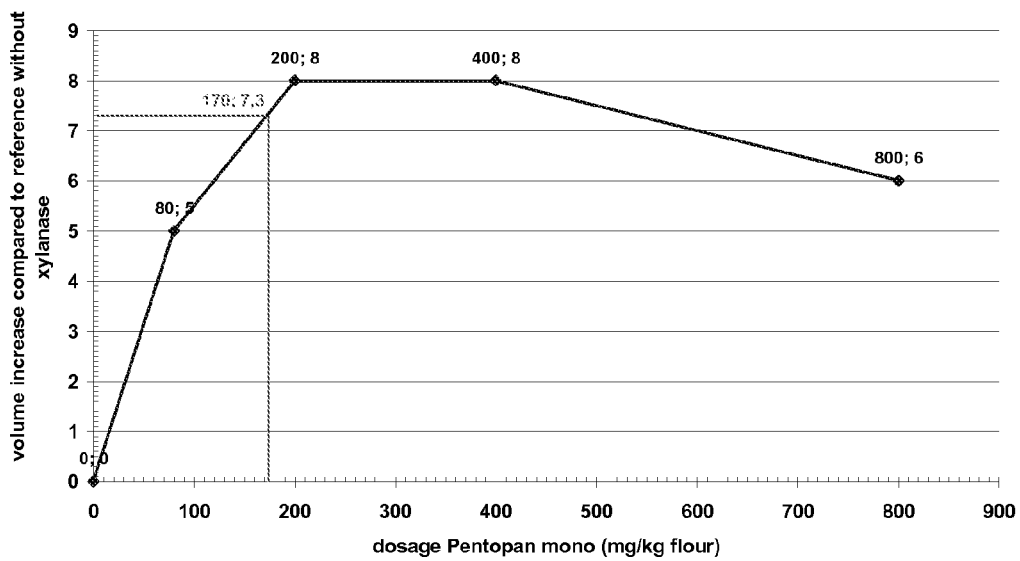

Bread volume increase due to endoxylanase addition is shown in FIGS. 2A and 2B. In order to obtain 90% of the maximum volume increase respectively 35 microliter of Ecopulp® TX200A or 170 mg of Pentopan® Mono need to be added to the dough. More than 1.7% (w/w) S-AX with an average degree of polymerisation lower than 30 is released when adding 100 microliters of Ecopulp® TX200A, or 2.8 times the dosage to obtain 90% of the maximum volume increase with this enzyme. More than 1.7% (w/w) S-AX with an average degree of polymerisation lower than 30 is released when adding 800 mg of Pentopan® Mono, or 4.7 times the dosage to obtain 90% of the maximum volume increase with this enzyme.

REFERENCES

Bushuk, W. Distribution of water in dough and bread. *The Bakers Digest.* 1966, 40, 38-40.

Courtin, C. M. and Delcour, J. A. Physicochemical and bread-making properties of low molecular weight wheat derived arabinoxylans. *J. Agr. Food Chem.* 1998, 46, 4066-4073.

Courtin, C. M., Roelants, A. and Delcour, J. A. Fractionation-reconstitution experiments provide insight into the role of endoxylanases in bread-making. *J. Agric. Food Chem.* 1999, 47, 1870-1877.

Courtin, C. M., Van den Broeck, H. and Delcour, J. A. Determination of reducing end sugar residues in oligo- and polysaccharides by gas-liquid chromatography. *J. Chromatogr. A* 2000, 866, 97-104.

Courtin, C. M., Gelders, G. G. and Delcour, J. A. Use of two endoxylanases with different substrate selectivity for understanding arabinoxylan functionality in wheat flour breadmaking. *Cereal Chem.* 2001, 78, 564-571.

Courtin, C. M. and Delcour, J. A. Arabinoxylans and endoxylanases in wheat flour bread-making. *J. Cereal Sci.* 2002, 35, 225-243.

Delzenne, N. M., Cani, P. D., Neyrinck, A. M. Modulation of glucagon-like peptide 1 and energy metabolism by inulin and oligofructose: experimental data. *J. Nutr.* 2007, 137:2547S-2551S.

Gibson, G. R. and Roberfroid M. B. Dietary modulation of the human colonic microbiota: introducing the concept of prebiotics. *J. Nutr.* 1995, 125, 1401-1412.

Hilhorst, R., Dunnewind, B., Orsel, R., Stegeman, P., van Vliet, T., Gruppen, H. and Schols, H. A. Baking performance, rheology, and chemical composition of wheat dough and gluten affected by xylanase and oxidative enzymes. *J. Food Sci.* 1999, 64, 808-813.

Hoseney, R. C. Yeast-leavened products, in: 'Principles of Cereal Science and Technology', second edition, Hoseney, R. C., ed., American Association of Cereal Chemists, Inc., St. Paul, Minn., USA, 1994, pp 229-273.

Loosveld, A. A., Maes, C., Grobet, P. J., Delcour, J. A. Quantitative and qualitative study of arabinogalactan-peptide during bread making. J. Agric. Food Chem. 1998, 46: 5026-5030.

Macfarlane, S., Macfarlane, G. T., Cummings, J. H. Prebiotics in the gastrointestinal tract. Aliment. Pharmacol. Ther. 2006, 24:701-714.

McCleary, B. V. Enzymatic modification of plant polysaccharides. *Int. J. Biol. Macromol.* 1986, 8, 349-354.

Michniewicz, J., Biliaderis, C. G. and Bushuk, W. Effect of added pentosans on some physical and technological characteristics of dough and gluten. *Cereal Chem.* 1991, 68, 252-258.

Michniewicz, J., Biliaderis, C. G. and Bushuk, W. Effect of added pentosans on some properties of wheat bread. *Food Chem.* 1992, 43, 251-257.

Moers K, Courtin C M, Brijs K, Delcour J A. A screening method for endo-beta-1,4-xylanase substrate selectivity. *Anal Biochem.* 2003, 319:73-7.

Moers, C, Celus, I., Brijs, K., Courtin, C. M., and Delcour, J. A. Endoxylanase substrate selectivity determines degradation of wheat water-extractable and water-unextractable arabinoxylan. *Carbohydrate Research* 2005, 340, 1319-1327.

Qi Si, J., Kofod, L. V. and Goddik, I. Effect of microbial xylanases on water insoluble wheat pentosans and in correlation with their baking effect. 1993, Application notes, Novo Nordisk. N° A-06279.

Rouau, X. and Moreau, D. Modification of some physico-chemical properties of wheat flour pentosans by an enzyme complex recommended for baking. *Cereal Chem.* 1993, 70, 626-632.

Rouau, X., El-Hayek, M.-L. and Moreau, D. Effect of an enzyme preparation containing pentosanases on the bread-making quality of flours in relation to changes in pentosan properties. *J. Cereal Sci.* 1994, 19, 259-272.

Yamada H., Itoh, K., Morishita, Y., Taniguchi, H. Structure and properties of oligosaccharides from wheat bran. *Cereal Foods World* 1993, 38, 490-492

Jiang, Z. Q., Kobayashi, A., Ahsan, M. M., Li, L. T., Kitaoka, M., Hayashi, K., Characterization of a thermophilic Family 10 endo-xylanase (XynB) from Thermotoga maritima that cleaves p-nitrophenyl-beta-D-xyloside. J. Biosci. Bioeng. 2001, 92, 423-428.

TABLE 1 overview of the characteristics of the different endoxylanase preparations used

| Commercial name | Abbreviation | Endoxylanase from | Glycosyl Hydrolase Family | Temperature optimum | Specific Activity at 35° C. | Producer |
| --- | --- | --- | --- | --- | --- | --- |
| Grindamyl ® Powerbake ® | GRIN PB | *Bacillus subtilis*, mutant form | GH11 | 50° C. | 1200 U/g | Danisco |
| Frimase ® B210 | XBS | *Bacillus subtilis* | GH11 | 50° C. | 42000 U/g | Puratos |
| Frimase ® 218 | XPH | *Pseudoalteromonas haloplanktis* | GH8 | 35° C. | 7800 U/g | Puratos |
| Ecopulp ® TX200A | ECOP | *Trichoderma longibrachiatum*, mutant form | GH11 | 70° C. | 132000 U/ml | AB Enzymes |
| Multifect ® Xylanase | MF XYL | *Trichoderma longibrachiatum* | GH11 | 50° C. | 300000 U/ml | Genencor |
| Shearzyme ® 500 L | XAA | *Aspergillus aculeatus* | GH10 | 65° C. | 6000 U/ml | Novozymes |
| Pentopan ® Mono BG | PP MONO | *Thermomyces lanuginosus* | GH11 | 65° C. | 300000 U/g | Novozymes |
| Pentopan ® 500 BG | PP 500 | *Humicola insolens* | mixture (non recombinant) | 60° C. | 192000 U/g | Novozymes |
| / | Tm-XynB | *Thermotoga maritima* | GH10 | 90° C. | 54 U/ml | Puratos |
| / | Tm-XynA | *Thermotoga maritima* | GH10 | | | Puratos |

TABLE 2

Total arabinoxylan (T-AX), water-soluble arabinoxylan (S-AX) and average degree of polymerization (avDP) of S-AX, loaf volume and bread moisture content of a series of breads prepared with or without endoxylanase addition. Breads with the same with the same experiment number were treated in parallel.

| Experiment number | Flour | Enzyme | Enzyme dose (g or ml per kg flour) | Enzyme dose (units per kg flour) | Water/flour ratio (w/w) | T-AX (g/100 g DM) | S-AX (g/100 g DM) | avDP S-AX | Loaf volume (relative to enzyme free control) | Bread moisture content |
| --- | --- | --- | --- | --- | --- | --- | --- | --- | --- | --- |
| 1 | Wheat endosperm | None | 0 | 0 | 59% | 2.09 | 0.94 | 302 | 100% | 32.5% |
| 1 | Wheat endosperm | XBS | 0.12 g | 5040 | 59% | 2.09 | 1.39 | 101 | 113% | 31.8% |
| 1 | Wheat endosperm | XPH | 0.12 g | 936 | 59% | 2.09 | 1.25 | 108 | 114% | 32.9% |
| 2 | Wheat wholegrain | None | 0 | 0 | 67% | 6.66 | 0.68 | 151 | 100% | 36.8% |
| 2 | Wheat wholegrain | PP MONO | 0.4 g | 120000 | 67% | 6.66 | 1.57 | 36 | 111% | 35.0% |
| 2 | Wheat wholegrain | XPH | 0.4 g | 3120 | 67% | 6.66 | 1.3 | 44 | 114% | 36.3% |
| 3 | Wheat wholegrain | None | 0 | 0 | 67% | 6.64 | 0.72 | 169 | 100% | 35.5% |
| 3 | Wheat wholegrain | MF XYL | 0.4 ml | 120000 | 67% | 6.64 | 1.28 | 61 | N.D. | 34.9% |
| 3 | Wheat wholegrain | GRIN PB | 0.4 g | 144 | 67% | 6.64 | 1.32 | 85 | N.D. | 36.0% |
| 3 | Wheat wholegrain | PP 500 | 0.4 g | 76800 | 67% | 6.64 | 1.55 | 55 | N.D. | 35.0% |
| 3 | Wheat wholegrain | PP MONO | 0.8 g | 240000 | 67% | 6.64 | 1.79 | 24 | N.D. | 35.5% |

TABLE 2-continued

Total arabinoxylan (T-AX), water-soluble arabinoxylan (S-AX) and average degree of polymerization (avDP) of S-AX, loaf volume and bread moisture content of a series of breads prepared with or without endoxylanase addition. Breads with the same with the same experiment number were treated in parallel.

| Experiment number | Flour | Enzyme | Enzyme dose (g or ml per kg flour) | Enzyme dose (units per kg flour) | Water/flour ratio (w/w) | T-AX (g/100 g DM) | S-AX (g/100 g DM) | avDP S-AX | Loaf volume (relative to enzyme free control) | Bread moisture content |
|---|---|---|---|---|---|---|---|---|---|---|
| 4 | Wheat wholegrain | None | 0 | 0 | 67% | 6.15 | 0.75 | 103 | 100% | 36.0% |
| 4 | Wheat wholegrain | XBS | 0.12 g | 5040 | 67% | 6.15 | 1.23 | 107 | 112% | 34.6% |
| 4 | Wheat wholegrain | ECOP | 0.1 ml | 13200 | 67% | 6.15 | 1.82 | 28 | 117% | 35.6% |
| 4 | Wheat wholegrain | ECOP | 0.2 ml | 26400 | 67% | 6.15 | 1.93 | 20 | 115% | 36.7% |
| 4 | Wheat wholegrain | ECOP | 0.4 ml | 52800 | 67% | 6.15 | 2.09 | 16 | 113% | 36.0% |

N.D. = not determined

TABLE 3

Total arabinoxylan (T-AX), water-soluble arabinoxylan (S-AX) and average degree of polymerization (avDP) of S-AX, loaf volume, bread moisture content, crumb firmness after 1 and 7 days of a series of breads prepared with or without addition of endoxylanases. Breads with the same experiment number were treated in parallel.

| Experiment number | Flour | Enzyme | Enzyme dose (g or ml per kg flour) | Enzyme dose (units per kg flour) | Water/flour ratio (w/w) | T-AX (g/100 g DM) | S-AX (g/100 g DM) | avDP S-AX | Loaf volume (relative to enzyme free control) | Crumb firmness after 1 day (average ± standard deviation) | Crumb firmness after 7 days (average ± standard deviation) |
|---|---|---|---|---|---|---|---|---|---|---|---|
| 1 | Wheat endosperm | None | 0 | 0 | 59% | 2.31 | 0.73 | 147 | 100% | 190 ± 13 | 358 ± 45 |
| 1 | Wheat endosperm | ECOP | 0.27 ml | 36000 | 59% | 2.31 | 1.51 | 23 | 111% | 162 ± 9 | 370 ± 17 |
| 2 | Wheat wholegrain | None | 0 | 0 | 67% | 6.65 | 0.82 | 90 | 100% | 244 ± 10 | 479 ± 44 |
| 2 | Wheat wholegrain | ECOP | 0.27 ml | 36000 | 67% | 6.65 | 2.01 | 19 | 110% | 241 ± 12 | 398 ± 40 |
| 3 | Wheat endosperm:wheat aleuron (95:5) | None | 0 | 0 | 59% | 4.23 | 0.76 | 134 | 100% | 170 ± 4 | 348 ± 19 |
| 3 | Wheat endosperm:wheat aleuron (95:5) | ECOP | 0.27 ml | 36000 | 59% | 4.23 | 1.78 | 23 | 116% | 137 ± 12 | 280 ± 14 |
| 4 | Wheat endosperm:wheat aleuron (90:10) | None | 0 | 0 | 59% | 5.64 | 0.77 | 115 | 100% | 207 ± 19 | 485 ± 37 |
| 4 | Wheat endosperm:wheat aleuron (90:10) | ECOP | 0.27 ml | 36000 | 59% | 5.64 | 2.04 | 21 | 117% | 159 ± 14 | 301 ± 11 |
| 5 | Wheat endosperm:wheat aleuron (85:15) | None | 0 | 0 | 64% | 7.47 | 0.82 | 96 | 100% | 293 ± 11 | 589 ± 66 |
| 5 | Wheat endosperm:wheat aleuron (85:15) | ECOP | 0.27 ml | 36000 | 64% | 7.47 | 2.39 | 21 | 114% | 188 ± 9 | 331 ± 12 |

TABLE 4

Total arabinoxylan (T-AX), water-soluble arabinoxylan (S-AX) and average degree of polymerization (avDP) of S-AX, loaf volume and bread moisture content of a series of breads prepared with or without endoxylanase addition. Breads with the same experiment number were treated in parallel.

| Experiment number | Flour | Enzyme | Enzyme dose[1] (g or ml per kg flour) | Enzyme dose[1] (units per kg flour) |
|---|---|---|---|---|
| 1 | Wheat wholegrain | None | 0 | 0 |
| 1 | Wheat wholegrain | XBS | 0.4 g | 16800 |
| 1 | Wheat wholegrain | XPH + PP MONO | 0.4 g + 0.4 g | 3120 + 120000 |
| 1 | Wheat wholegrain | XBS + XPH + PP MONO | 0.4 g + 0.4 g + 0.4 g | 16800 + 3120 + 120000 |
| 2 | Wheat wholegrain | None | 0 | 0 |
| 2 | Wheat wholegrain | XPH | 0.4 g | 3120 |
| 2 | Wheat wholegrain | PP MONO + PP 500 | 0.4 g + 0.1 g | 120000 + 19200 |
| 2 | Wheat wholegrain | XPH + PP MONO + PP 500 | 0.4 g + 0.4 g + 0.1 g | 3120 + 120000 + 19200 |
| 3 | Wheat wholegrain | None | 0 | 0 |
| 3 | Wheat wholegrain | Tm-XynB | 5.6 ml | 300 |
| 3 | Wheat wholegrain | XPH | 0.4 g | 3120 |
| 3 | Wheat wholegrain | Tm-XynB + XPH | 5.6 ml + 0.4 g | 300 + 3120 |

TABLE 4-continued

Total arabinoxylan (T-AX), water-soluble arabinoxylan (S-AX) and average degree of polymerization (avDP) of S-AX, loaf volume and bread moisture content of a series of breads prepared with or without endoxylanase addition. Breads with the same experiment number were treated in parallel.

| | | | | |
|---|---|---|---|---|
| 4 | Wheat wholegrain | None | 0 | 0 |
| 4 | Wheat wholegrain | Tm-XynB | 5.6 ml | 300 |
| 4 | Wheat wholegrain | XBS + XPH | 0.4 g + 0.4 g | 16800 + 3120 |
| 4 | Wheat wholegrain | Tm-XynB + XBS + XPH | 5.6 ml + 0.4 g + 0.4 g | 300 + 16800 + 3120 |
| 5 | Wheat wholegrain | None | 0 | 0 |
| 5 | Wheat wholegrain | Tm-XynA + XBS + XPH | 5.6 ml + 0.4 g + 0.4 g | |
| 5 | Wheat wholegrain | Tm-XynB + XBS + XPH + PP MONO | 5.6 ml + 0.4 g + 0.4 g + 0.2 g | |
| 5 | Wheat wholegrain | Tm-XynA + XBS + XPH + PP MONO | 5.6 ml + 0.4 g + 0.4 g + 0.2 g | |

| Experiment number | Water/flour ratio (w/w) | T-AX (g/100 g DM) | S-AX (g/100 g DM) | avDP S-AX | Loaf volume (relative to enzyme free control) | Bread moisture content |
|---|---|---|---|---|---|---|
| 1 | 67% | 6.66 | 0.68 | 151 | N.D. | N.D. |
| 1 | 67% | 6.66 | 1.40 | 68 | N.D. | N.D. |
| 1 | 67% | 6.66 | 1.60 | 29 | N.D. | N.D. |
| 1 | 67% | 6.66 | 1.76 | 23 | N.D. | N.D. |
| 2 | 67% | 6.66 | 0.68 | 151 | 100% | 36.8% |
| 2 | 67% | 6.66 | 1.30 | 44 | 114% | 36.3% |
| 2 | 67% | 6.66 | 1.56 | 34 | 117% | 35.1% |
| 2 | 67% | 6.66 | 1.71 | 23 | 114% | 36.2% |
| 3 | 67% | 6.4 | 0.64 | 136 | 100% | N.D. |
| 3 | 67% | 6.4 | 1.53 | 19 | 105% | N.D. |
| 3 | 67% | 6.4 | 1.46 | 39 | 118% | N.D. |
| 3 | 67% | 6.4 | 1.72 | 14 | 115% | N.D. |
| 4 | 67% | 6.4 | 0.64 | 136 | 100% | N.D. |
| 4 | 67% | 6.4 | 1.53 | 19 | 105% | N.D. |
| 4 | 67% | 6.4 | 1.54 | 31 | 116% | N.D. |
| 4 | 67% | 6.4 | 1.85 | 13 | 114% | N.D. |
| 5 | 67% | 6.64 | 0.72 | 128 | 100% | 37.2% |
| 5 | 67% | 6.64 | 1.75 | 24 | 128% | 35.7% |
| 5 | 67% | 6.64 | 1.91 | 11 | 132% | 36.1% |
| 5 | 67% | 6.64 | 2.00 | 17 | 132% | 36.5% |

N.D. = not determined.
[1] In same order of appearance as in the "enzyme" column

TABLE 5

Total arabinoxylan (T-AX), water-soluble arabinoxylan (S-AX) and average degree of polymerization (avDP) of S-AX, loaf volume and bread moisture content of a series of breads prepared with or without endoxylanase addition. Breads with the same experiment number were treated in parallel.

| Experiment number | Flour | Enzyme | Enzyme dose[1] (g or ml per kg flour) | Enzyme dose[1] (units per kg flour) | Water/flour ratio (w/w) | T-AX (g/100 g DM) | S-AX (g/100 g DM) | avDP S-AX | Loaf volume (relative to enzyme free control) | Bread moisture content |
|---|---|---|---|---|---|---|---|---|---|---|
| 1 | Wheat endosperm:rye bran (85:15) | None | 0 | 0 | 67% | 4.93 | 0.73 | 128 | 100% | 36.3% |
| 1 | Wheat endosperm:rye bran (85:15) | ECOP | 0.4 ml | 52800 | 67% | 4.93 | 2.11 | 30 | 109% | 35.4% |
| 1 | Wheat endosperm:rye bran (85:15) | XBS + XPH + PP MONO | 0.4 g + 0.4 g + 0.4 g | 16800 + 3120 + 120000 | 67% | 4.93 | 1.83 | 35 | 110% | 35.5% |
| 2 | Wheat endosperm:rye bran (80:20) | None | 0 | 0 | 69% | 7.07 | 1.05 | 140 | 100% | 37.0% |
| 2 | Wheat endosperm:rye bran (80:20) | ECOP | 0.4 ml | 52800 | 69% | 7.07 | 2.42 | 30 | 111% | 37.0% |

TABLE 5-continued

Total arabinoxylan (T-AX), water-soluble arabinoxylan (S-AX) and average degree of polymerization (avDP) of S-AX, loaf volume and bread moisture content of a series of breads prepared with or without endoxylanase addition. Breads with the same experiment number were treated in parallel.

| Experiment number | Flour | Enzyme | Enzyme dose[1] (g or ml per kg flour) | Enzyme dose[1] (units per kg flour) | Water/flour ratio (w/w) | T-AX (g/100 g DM) | S-AX (g/100 g DM) | avDP S-AX | Loaf volume (relative to enzyme free control) | Bread moisture content |
|---|---|---|---|---|---|---|---|---|---|---|
| 2 | Wheat endosperm:rye bran (80:20) | XBS + XPH + PP MONO | 0.4 g + 0.4 g + 0.4 g | 16800 + 3120 + 120000 | 69% | 7.07 | 2.00 | 34 | 111% | 37.0% |
| 3 | Wheat endosperm:rye aleurone (85:15) | XBS + XPH + PP MONO | 0.4 g + 0.4 g + 0.4 g | 16800 + 3120 + 120000 | | N.D. | 2.23 | 35 | N.D. | 33.3% |

N.D. = not determined.
[1] In same order of appearance as in the "enzyme" column

TABLE 6

Total arabinoxylan (T-AX), water-soluble arabinoxylan (S-AX) and average degree of polymerization (avDP) of S-AX, loaf volume, bread moisture content, crumb firmness after 1 and 7 days of a series of breads prepared with or without addition of endoxylanases. Breads with the same experiment number were treated in parallel.

| Experiment number | Flour | Enzyme | Enzyme dose (g or ml per kg flour) | Enzyme dose (units per kg flour) | Water/flour ratio (w/w) | T-AX (g/100 g DM) | S-AX (g/100 g DM) | avDP S-AX | Loaf volume (relative to enzyme free control) | Bread moisture content | Crumb firmness after 1 day (average ± standard deviation) | Crumb firmness after 7 days (average ± standard deviation) |
|---|---|---|---|---|---|---|---|---|---|---|---|---|
| 1 | Rye endosperm:Wheat endosperm (70:30) | None | 0 | 0 | 83% | 5.28 | 2.36 | 295 | 100% | 45.4% | N.D. | N.D. |
| 1 | Rye endosperm:Wheat endosperm (70:30) | XBS | 0.12 g | 5040 | 83% | 5.28 | 2.64 | 214 | 110% | 41.7% | N.D. | N.D. |
| 1 | Rye endosperm:Wheat endosperm (70:30) | XAA | 0.5 ml | 3000 | 83% | 5.28 | 2.74 | 45 | 114% | 41.0% | N.D. | N.D. |
| 2 | Rye endosperm:Wheat endosperm (70:30) | None | 0 | 0 | 83% | 5.27 | 2.33 | 202 | 100% | 36.9% | 1218 ± 48 | 1740 ± 125 |
| 2 | Rye endosperm:Wheat endosperm (70:30) | ECOP | 0.27 ml | 34000 | 83% | 5.27 | 3.05 | 45 | 117% | 36.2% | 900 ± 76 | 2519 ± 516 |

N.D. = not determined.

TABLE 7

Total arabinoxylan (T-AX), water-soluble arabinoxylan (S-AX) and average degree of polymerization (avDP) of S-AX, loaf volume, bread moisture content, crumb firmness after 1 and 7 days of a series of breads prepared with or without addition of endoxylanases. Breads with the same experiment number were treated in parallel.

| Experiment number | Flour | Enzyme | Enzyme dose[1] (g or ml per kg flour) | Enzyme dose[1] (units per kg flour) | Water/flour ratio (w/w) | T-AX (g/100 g DM) |
|---|---|---|---|---|---|---|
| 1 | Wheat endosperm:rye endosperm 1150 (70:30) | None | 0 | 0 | 68% | 4.19 |
| 1 | Wheat endosperm:rye endosperm 1150 (70:30) | XBS + XAA | 0.2 g + 0.4 ml | 8400 + 2400 | 68% | 4.19 |
| 1 | Wheat endosperm:rye endosperm 1150 (70:30) | XPH + XAA | 0.2 g + 0.4 ml | 1560 + 2400 | 68% | 4.19 |

TABLE 7-continued

Total arabinoxylan (T-AX), water-soluble arabinoxylan (S-AX) and average degree of polymerization (avDP) of S-AX, loaf volume, bread moisture content, crumb firmness after 1 and 7 days of a series of breads prepared with or without addition of endoxylanases. Breads with the same experiment number were treated in parallel.

| | | | | | | |
|---|---|---|---|---|---|---|
| 1 | Wheat endosperm:rye endosperm 1150 (70:30) | Tm-XynB | 5.6 ml | 300 | 68% | 4.19 |
| 2 | Wheat endosperm:rye 1740 (75:25) | None | 0 | 0 | 64% | 3.55 |
| 2 | Wheat endosperm:rye 1740 (75:25) | XBS + PP MONO | 0.4 g + 0.8 g | 16800 + 240000 | 64% | 3.55 |
| 2 | Wheat endosperm:rye 1740 (75:25) | XPH + PP MONO | 0.4 g + 0.8 g | 3120 + 240000 | 64% | 3.55 |
| 2 | Wheat endosperm:rye 1740 (75:25) | XBS + XPH + PP MONO | 0.4 g + 0.4 g + 0.4 g | 16800 + 3120 + 120000 | 64% | 3.55 |
| 3 | Wheat endosperm | None | 0 | 0 | 60% | 2.24 |
| 3 | Wheat endosperm:rye 1740 (75:25) | ECOP | 0.4 ml | 52800 | 64% | 3.35 |
| 3 | Wheat endosperm:rye 1740 (75:25) | XBS + XPH + PP MONO | 0.4 g + 0.4 g + 0.4 g | 16800 + 3120 + 120000 | 64% | 3.35 |
| 3 | Wheat end.:rye end. 1740:rye bran (80:10:10) | ECOP | 0.4 ml | 52800 | 63% | 4.5 |
| 3 | Wheat end.:rye end. 1740:rye bran (80:10:10) | XBS + XPH + PP MONO | 0.4 g + 0.4 g + 0.4 g | 16800 + 3120 + 120000 | 63% | 4.5 |
| 3 | Wheat end.:rye end.1740:rye bran (75:15:10) | ECOP | 0.4 ml | 52800 | 64% | 4.75 |
| 3 | Wheat end.:rye end.1740:rye bran (75:15:10) | XBS + XPH + PP MONO | 0.4 g + 0.4 g + 0.4 g | 16800 + 3120 + 120000 | 64% | 4.76 |

| Experiment number | S-AX (g/100 g DM) | avDP S-AX | Loaf volume (relative to control[2]) | Bread moisture content | Crumb firmness after 1 day (average ± standard deviation) | Crumb firmness after 7 days (average ± standard deviation) |
|---|---|---|---|---|---|---|
| 1 | 1.38 | 283 | 100% | 36.1% | 564 ± 80 | 1096 ± 131 |
| 1 | 2.17 | 41 | 123% | 35.9% | 451 ± 31 | 690 ± 42 |
| 1 | 2.17 | 41 | 126% | 35.6% | 392 ± 38 | 673 ± 53 |
| 1 | 2.17 | 21 | 101% | 36.9% | 487 ± 48 | 932 ± 119 |
| 2 | 1.20 | 206 | N.D. | 34.0% | N.D. | N.D. |
| 2 | 2.09 | 26 | N.D. | 34.4% | N.D. | N.D. |
| 2 | 2.07 | 23 | N.D. | 35.2% | N.D. | N.D |
| 2 | 2.08 | 29 | N.D. | 35.4% | N.D. | N.D. |
| 3 | 0.74 | 120 | 100% | 34.3% | 134 ± 7 | 337 ± 15 |
| 3 | 2.05 | 27 | 106% | 34.1% | 99 ± 4 | 237 ± 16 |
| 3 | 2.01 | 31 | 105% | 33.4% | 100 ± 4 | 270 ± 19 |
| 3 | 2.07 | 29 | 99% | 34.7% | 115 ± 9 | 247 ± 9 |
| 3 | 1.91 | 32 | 100% | 33.7% | 107 ± 5 | 264 ± 21 |
| 3 | 2.22 | 26 | 99% | 34.0% | 105 ± 3 | 238 ± 14 |
| 3 | 1.98 | 33 | 98% | 34.7% | 121 ± 8 | 254 ± 19 |

N.D. = not determined.
[1]In same order of appearance as in the "enzyme" column
[2]In experiment 1 the control is the enzyme-free bread, in experiment 3 the control is the 100% wheat endosperm bread

TABLE 8

Total arabinoxylan (T-AX), water-soluble arabinoxylan (S-AX) and average degree of polymerization (avDP) of S-AX, loaf volume and bread moisture content of a series of breads prepared with or without endoxylanase and/or AXOS addition. Breads with the same experiment number were treated in parallel.

| Experiment number | Flour | AXOS preparation (g per kg flour) | Enzyme | Enzyme dose[1] (g or ml per kg flour) | Enzyme dose[1] (units per kg flour) | Water/flour ratio (w/w) | T-AX (g/100 g DM) | S-AX (g/100 g DM) | avDP S-AX | Loaf volume (relative to enzyme free control) | Bread moisture content |
|---|---|---|---|---|---|---|---|---|---|---|---|
| 1 | Wheat endosperm | 0 | None | 0 | 0 | 59% | 2.16 | 0.84 | 221 | 100% | 32.6% |
| 1 | Wheat endosperm | 0 | ECOP | 0.4 ml | 52800 | 59% | 2.16 | 1.69 | 24 | 112% | 32.6% |
| 1 | Wheat endosperm | 10 | ECOP | 0.4 ml | 52800 | 59% | 2.16 | 2.19 | 18 | 113% | 32.1% |

The invention claimed is:

1. A baked product comprising at least one thermophilic endoxylanase, wherein said product has a level of at least 1.56 g/100 g dry matter of water-soluble arabinoxylan with an average degree of polymerization ranging from 5 to 50.

2. The baked product according to claim 1, wherein the entire amount of said water-soluble arabinoxylan is derived from arabinoxylan present in the recipe of the baked product.

* * * * *